United States Patent
Torikai et al.

(10) Patent No.: US 9,325,898 B2
(45) Date of Patent: Apr. 26, 2016

(54) COMMUNICATION APPARATUS AND METHOD FOR CONTROLLING THE SAME

(71) Applicant: CANON KABUSHIKI KAISHA, Tokyo (JP)

(72) Inventors: Hiroyuki Torikai, Tokyo (JP); Koji Hatanaka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 14/056,836

(22) Filed: Oct. 17, 2013

(65) Prior Publication Data
US 2014/0112326 A1 Apr. 24, 2014

(30) Foreign Application Priority Data

Oct. 23, 2012 (JP) .................. 2012-233674
Dec. 28, 2012 (JP) .................. 2012-286673

(51) Int. Cl.
*H04W 76/04* (2009.01)
*H04N 5/232* (2006.01)
*H04W 76/02* (2009.01)

(52) U.S. Cl.
CPC .......... *H04N 5/23222* (2013.01); *H04N 5/232* (2013.01); *H04N 5/23206* (2013.01); *H04N 5/23293* (2013.01); *H04W 76/02* (2013.01); *H04W 76/023* (2013.01); *H04W 76/04* (2013.01); *H04W 76/043* (2013.01)

(58) Field of Classification Search
None
See application file for complete search history.

(56) References Cited

U.S. PATENT DOCUMENTS

| 7,734,698 | B2 * | 6/2010 | Mullis et al. ............. 709/206 |
| 2006/0084417 | A1 * | 4/2006 | Melpignano et al. ...... 455/418 |
| 2008/0183857 | A1 * | 7/2008 | Barfield et al. .......... 709/224 |
| 2012/0196537 | A1 * | 8/2012 | Sasai et al. ............ 455/41.2 |
| 2013/0115990 | A1 * | 5/2013 | Koc et al. ............. 455/509 |

FOREIGN PATENT DOCUMENTS

JP  2005-176235 A  6/2005

* cited by examiner

*Primary Examiner* — Chi H Pham
*Assistant Examiner* — Shick Hom
(74) *Attorney, Agent, or Firm* — Canon USA, Inc. IP Division

(57) ABSTRACT

A method for controlling a communication apparatus includes connecting to a first network formed by an access point, establishing communication with an information processing apparatus on the first network by using a first application, determining whether the information processing apparatus is operating as the access point forming the first network, detecting a transition of the first application to a background, and performing control to disconnect from the first network after it is determined that the information processing apparatus is operating as the access point and after the transition of the first application to the background is detected.

17 Claims, 20 Drawing Sheets

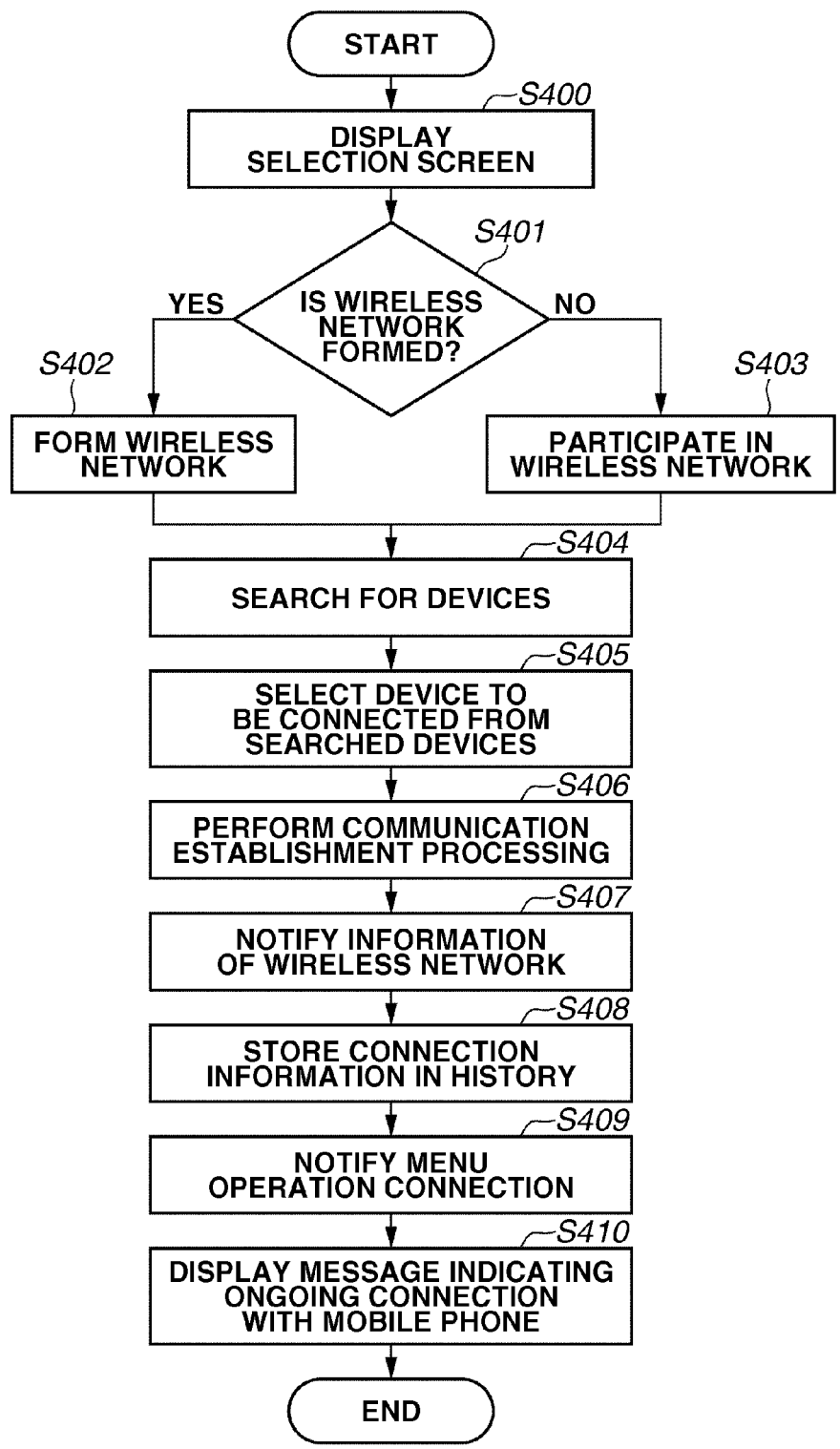

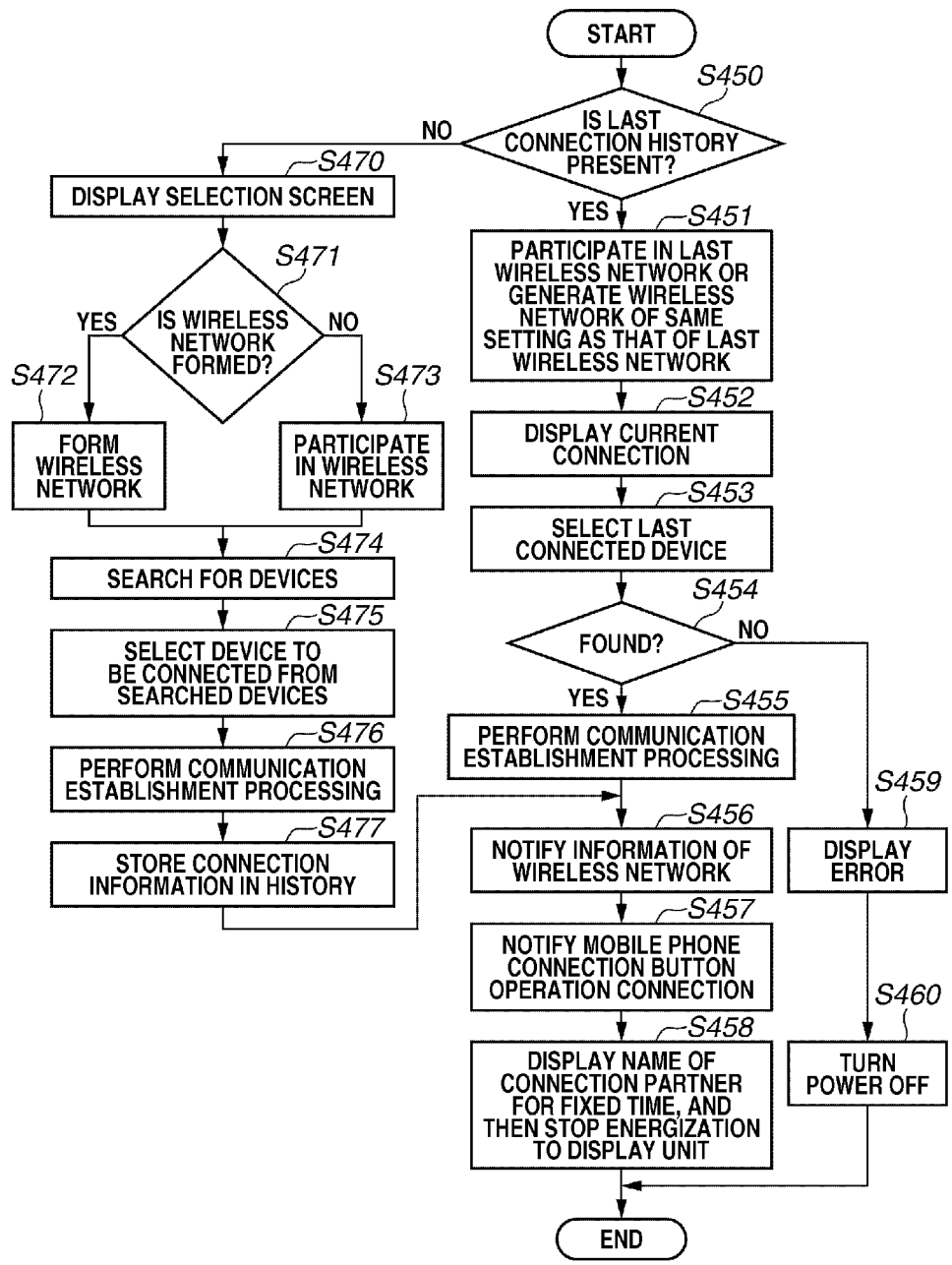

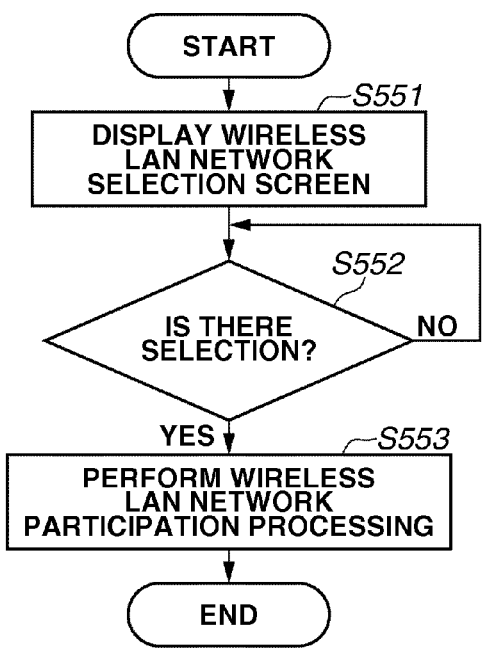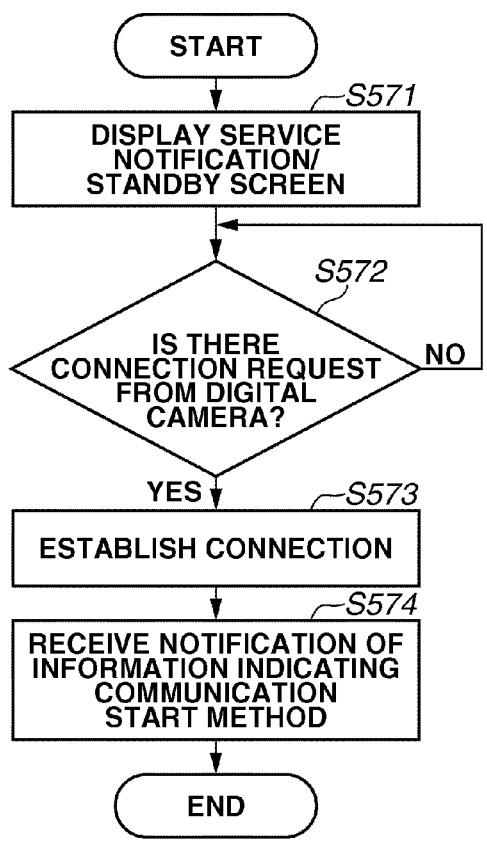

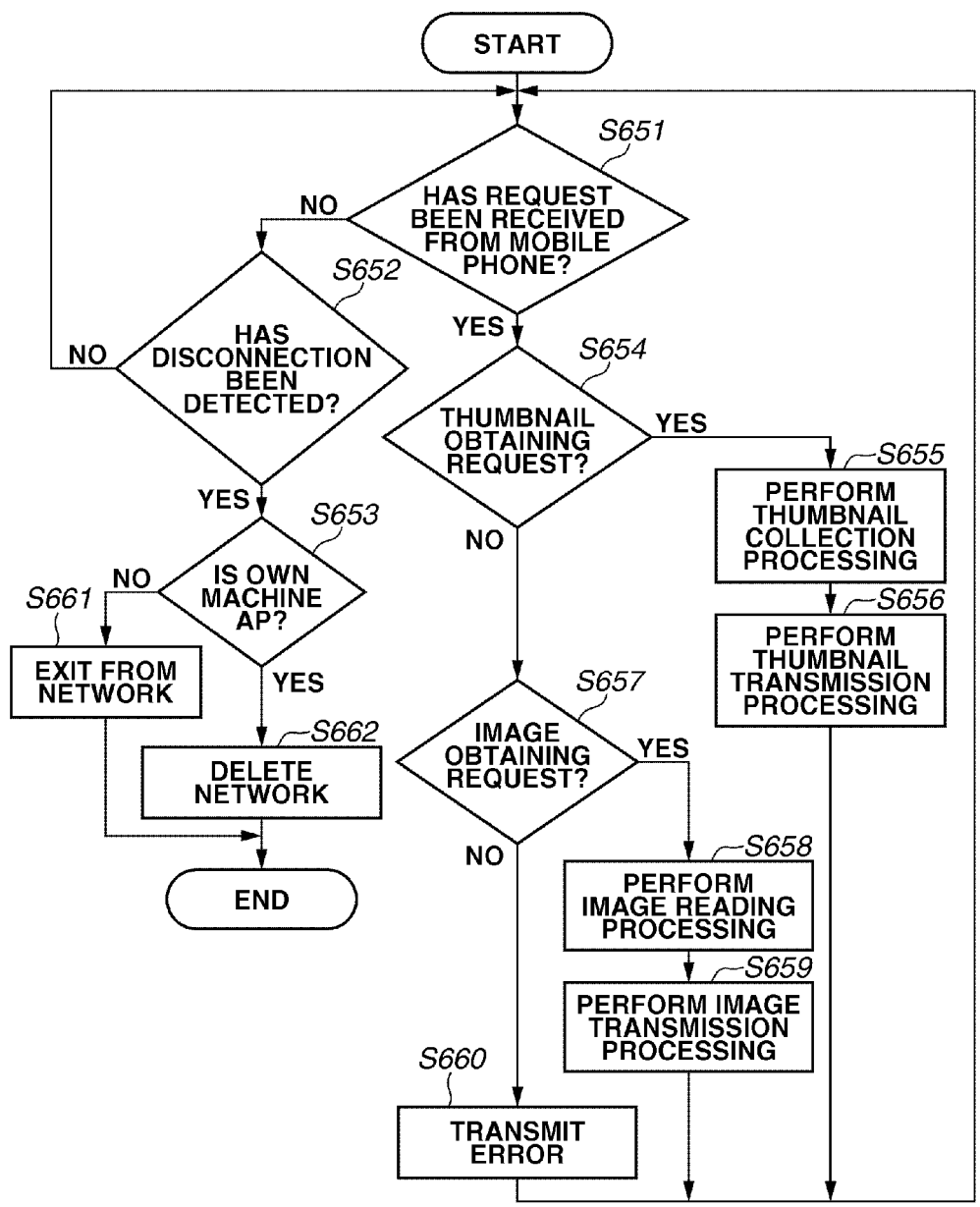

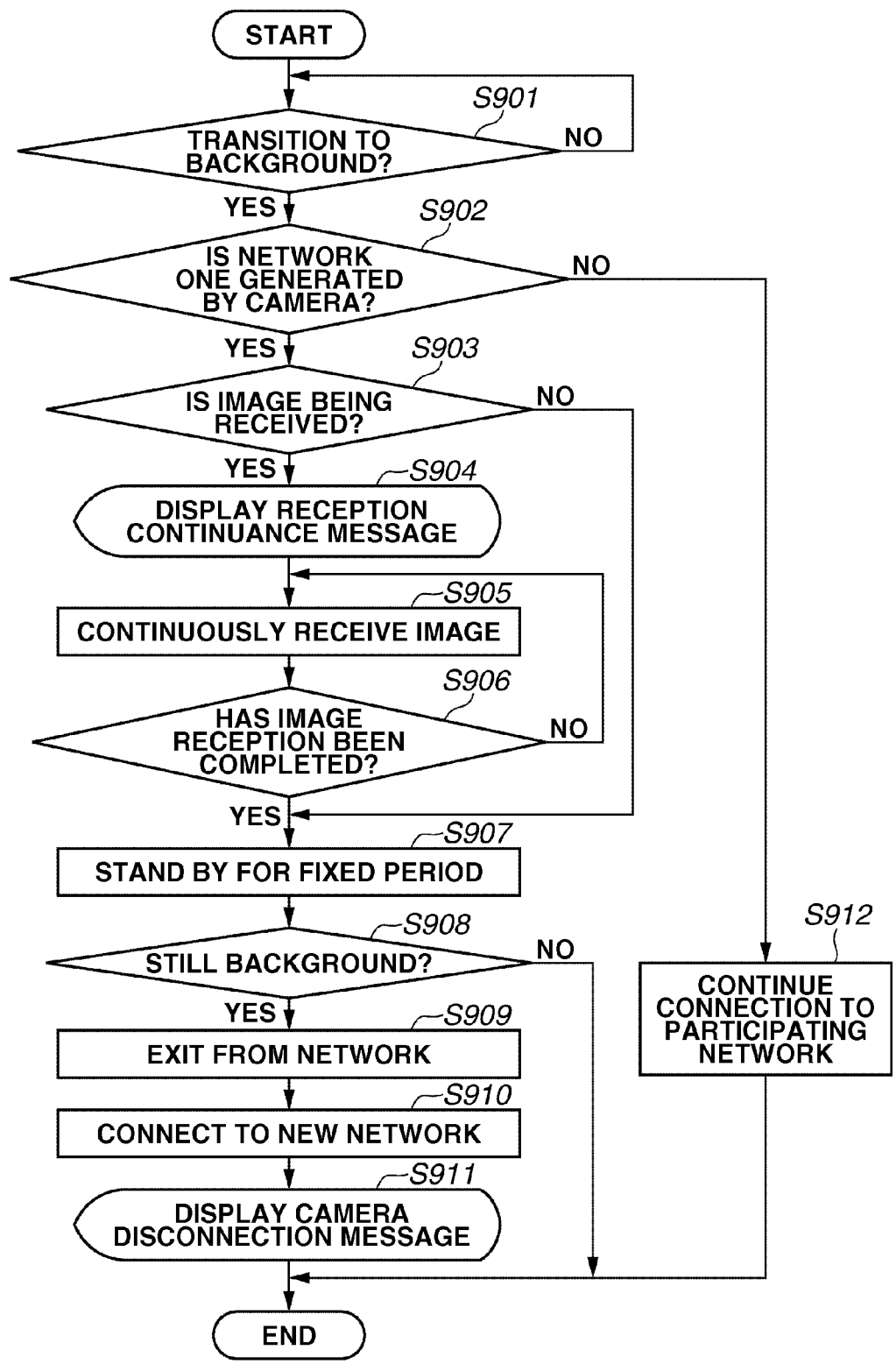

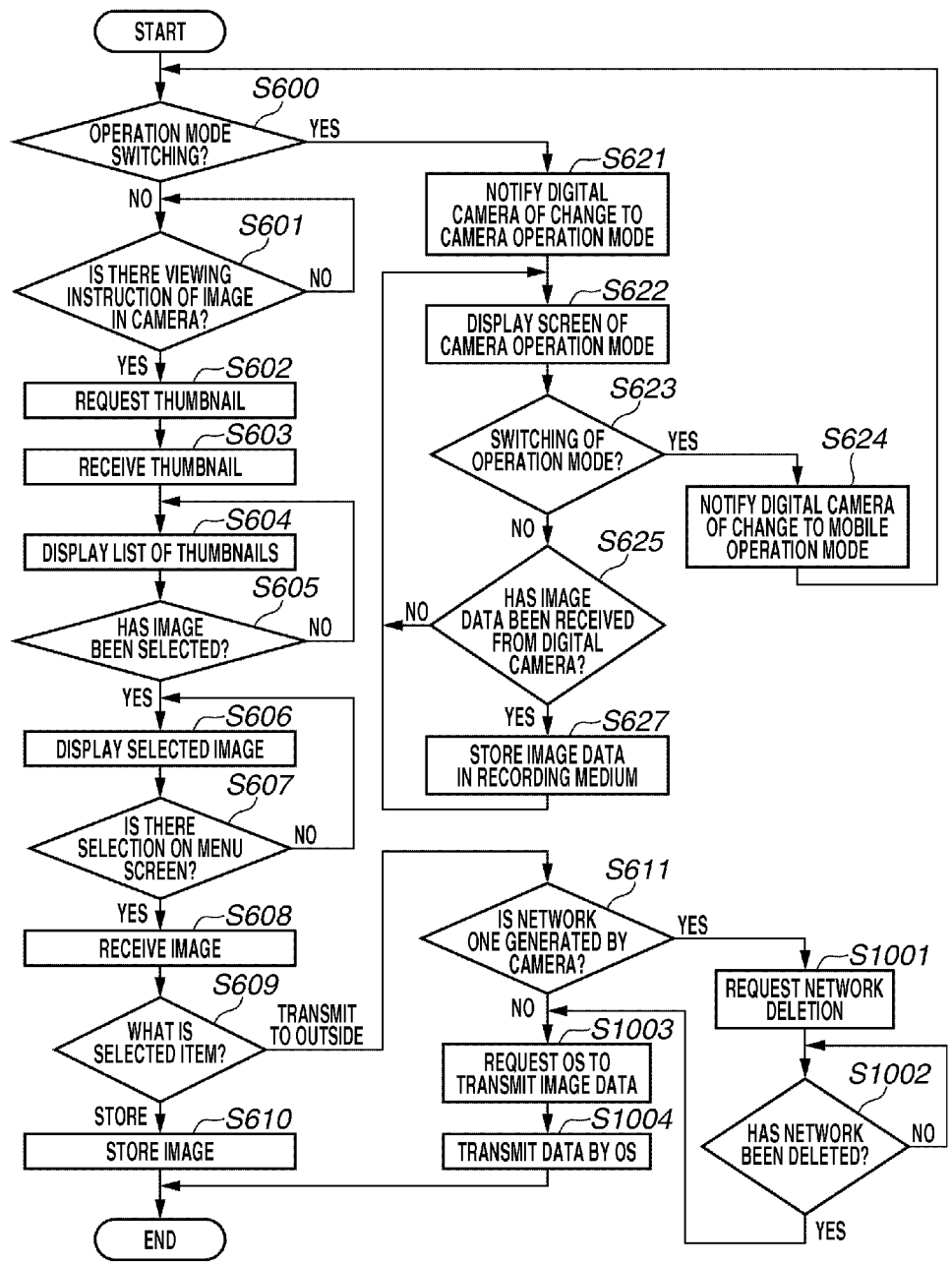

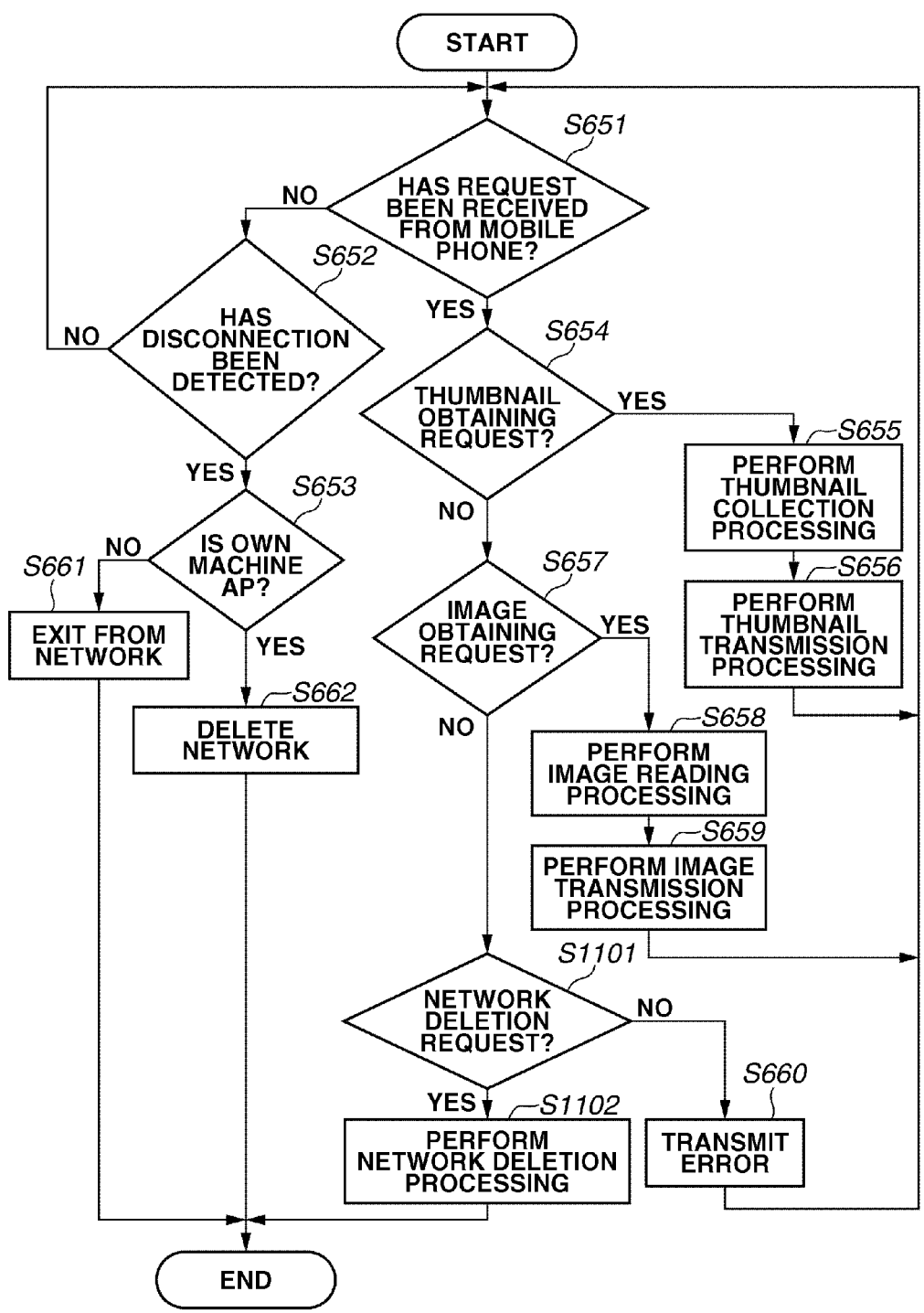

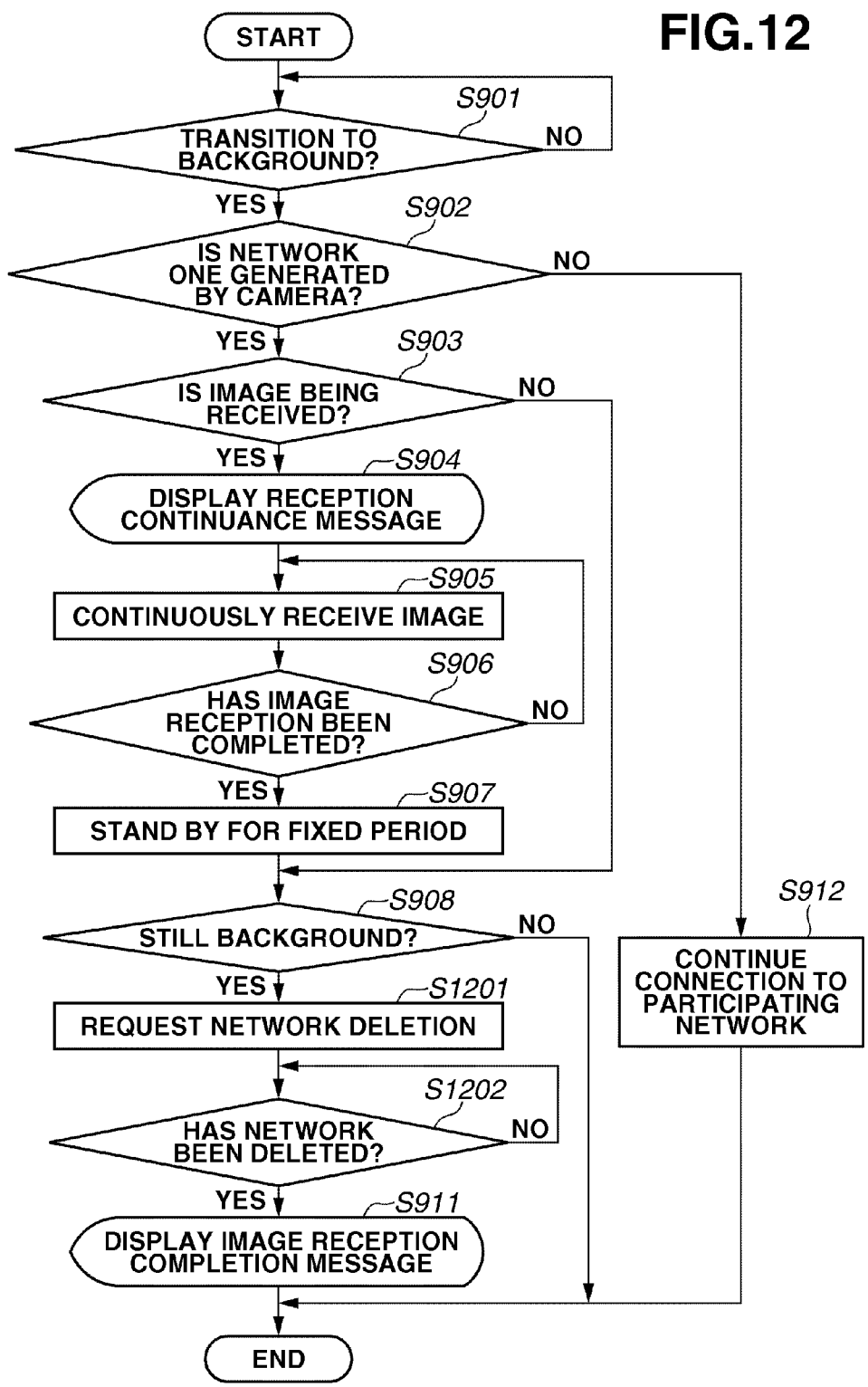

COMMUNICATION APPARATUS AND METHOD FOR CONTROLLING THE SAME

BACKGROUND

1. Field

Aspects of the present invention generally relate to a communication apparatus capable of communicating with an information processing apparatus.

2. Description of the Related Art

Recently, a wireless communication function has been provided to a digital camera to cooperate with a mobile phone. When the digital camera and the mobile phone are connected to each other, which device to be operated generally varies from one used scene to the other. For example, Japanese Patent Application Laid-Open No. 2005-176235 discusses a technology of operating the mobile phone connected to the camera via wireless communication to remote-control the digital camera. Particularly, a mobile phone that enables a user to install various applications as desired, which is typified by a smartphone, can easily cooperate with the digital camera by preparing applications corresponding to the digital camera.

SUMMARY

According to an aspect of the present invention, a communication apparatus includes a connection unit that connects to a first network formed by an access point, a data communication unit configured to establish communication with an information processing apparatus on the first network by using a first application, a determination unit configured to determine whether the information processing apparatus is operating as the access point forming the first network, a detection unit configured to detect a transition of the first application to a background, and a control unit configured to perform control to disconnect from the first network after the determination unit determines that the information processing apparatus is operating as the access point and after the detection unit detects the transition of the first application to the background.

Further features of the present disclosure will become apparent from the following description of exemplary embodiments with reference to the attached drawings.

BRIEF DESCRIPTION OF THE DRAWINGS

FIG. 4A is a flowchart illustrating an operation of the digital camera.

FIG. 4B is a flowchart illustrating an operation of the digital camera.

FIGS. 5Ba and 5Bb are flowcharts each illustrating an operation of the mobile phone.

FIG. 6B is a flowchart illustrating an operation of the digital camera.

FIG. 9 is a flowchart illustrating an operation of the mobile phone.

FIG. 10 is a flowchart illustrating an operation of the mobile phone.

FIG. 11 is a flowchart illustrating an operation of the digital camera.

FIG. 12 is a flowchart illustrating an operation of the mobile phone.

DESCRIPTION OF THE EMBODIMENTS

Exemplary embodiments will be described below with reference to the accompanying drawings.

The exemplary embodiments described below are only examples and can thus be modified or changed appropriately based on a configuration and various conditions of an apparatus to which the following disclosure can be applied. Further, the exemplary embodiments can be appropriately combined.

<Configuration of Digital Camera>

Figure 1:
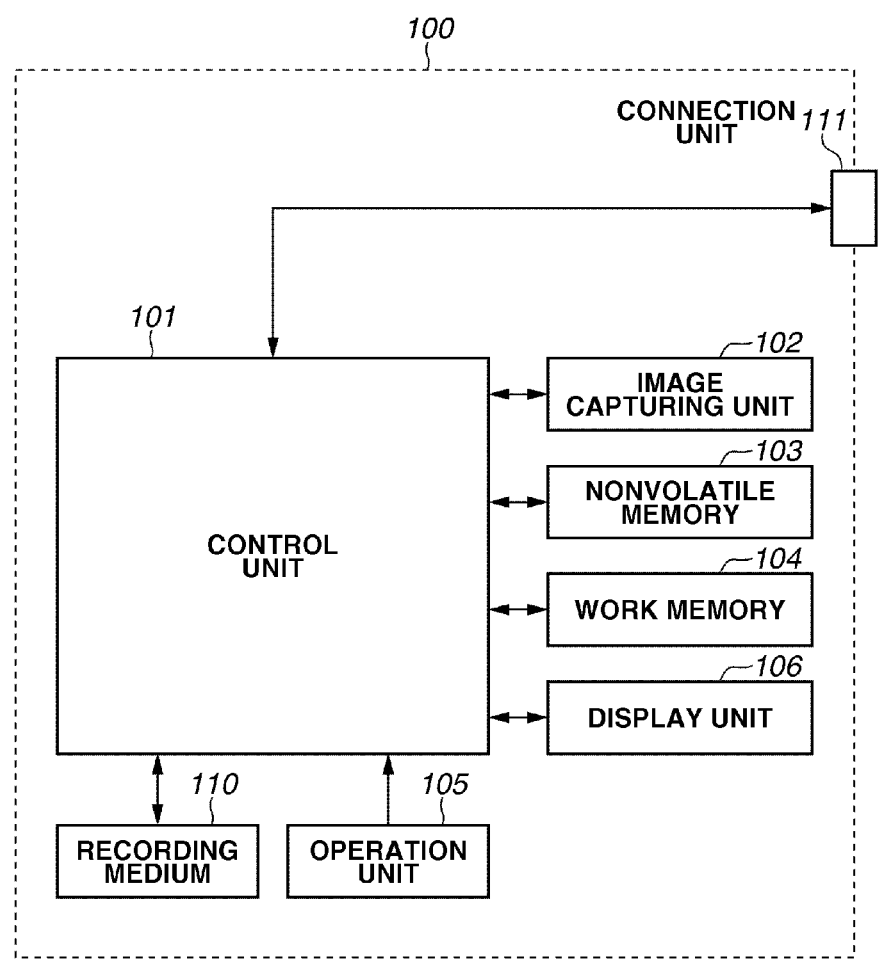
FIG. 1 is a block diagram illustrating a configuration of a digital camera.

FIG. 1 is a block diagram illustrating a configuration example of a digital camera 100 that is an example of an information processing apparatus according to a first exemplary embodiment. The digital camera will be described as the example of the information processing apparatus. However, the information processing apparatus is not limited to this. For example, the information processing apparatus can be a mobile type media player or an information processing apparatus such as a tablet device or a personal computer.

A control unit 101 controls each unit of the digital camera 100 according to an input signal or a program described below. In place of controlling the entire apparatus by the control unit 101, the entire apparatus can be controlled by sharing processing among a plurality of hardware units.

An image capturing unit 102 converts object light image-formed by a lens included therein into an electric signal, and performs noise reduction processing to output digital data as image data. The captured image data is stored in a buffer memory, and then subjected to predetermined calculation at the control unit 101 to be recorded on a recording medium 110.

A nonvolatile memory 103, which is an electrically erasable/recordable nonvolatile memory, stores the program described below and executed by the control unit 101.

A work memory 104 is used as a buffer memory for temporarily storing the image data captured by the image capturing unit 102, an image display memory of a display unit 106, or a work region of the control unit 101.

An operation unit 105 is used for receiving an instruction given from a user to the digital camera 100. The operation unit 105 includes, for example, a power button operated by the user to instruct power ON/OFF of the digital camera 100, a release switch for instructing photographing, and a reproducing button for instructing reproduction of the image data. The operation unit 105 further includes an operation member such as a dedicated connection button for starting communication with an external device via a connection unit 111 described below. A touch panel formed in the display unit 106 described below is also included in the operation unit 105. The release switch includes SW 1 and SW 2. When the release switch is half-pressed, the SW 1 is turned ON. Accordingly, an instruction of performing photographing preparation such as auto-focus (AF) processing, auto-exposure (AE) processing, auto-white balance (AWB) processing, or flash pre-emission (EF) processing is received. When the release switch is fully pressed, the SW 2 is turned ON. Accordingly, an instruction of performing photographing is received.

The display unit 106 displays a viewfinder image during photographing, the captured image data, or a character for a dialog operation. The display unit 106 does not always need to include the digital camera 100. The digital camera 100 can be connected to the internal or external display unit 106, and only needs to have at least a display control function for controlling displaying of the display unit 106.

The image data output from the image capturing unit 102 can be recorded in a recording medium 110. The recording medium 110 can be configured to be detachable from or included in the digital camera 100. In other words, the digital camera 100 only needs to include at least a unit for accessing the recording medium 110.

The connection unit 111 is an interface for connection to the external apparatus. The digital camera 100 according to the present exemplary embodiment can transfer data with the external apparatus via the connection unit 111. In the present exemplary embodiment, the connection unit 111 includes an interface for communication with the external apparatus via a wireless local area network (LAN). The control unit 101 controls the connection unit 111 to realize wireless communication with the external apparatus. A communication method is not limited to the wireless LAN.

The digital camera 100 according to the present exemplary embodiment can operate as a slave apparatus in an infrastructure mode. When operated as the slave apparatus, the digital camera 100 can participate, by connecting to a surrounding access point (AP), in a network formed by the AP. The digital camera 100 according to the present exemplary embodiment, which is a kind of AP, can also function as a simple AP more limited in function, such as a microaccess point. The AP in the present exemplary embodiment is an example of a relay apparatus. When operated as the simple AP, the digital camera 100 forms a network by itself. An apparatus around the digital camera 100 recognizes the digital camera 100, and can participate in the network formed by the digital camera 100. A program for operating the digital camera 100 is stored in the nonvolatile memory 103.

The digital camera 100 according to the present exemplary embodiment, which is a kind of AP, is the simple AP that does not have any gateway function for transferring data received from the slave apparatus to an Internet provider. Thus, even when it receives data from the other apparatus participating in the network formed by itself, the digital camera 100 cannot transfer the data to a network such as the Internet.

The digital camera 100 has been described above.

<Configuration of Mobile Phone>

Next, a mobile phone 200 that is an example of a communication apparatus will be described.

Figure 2:
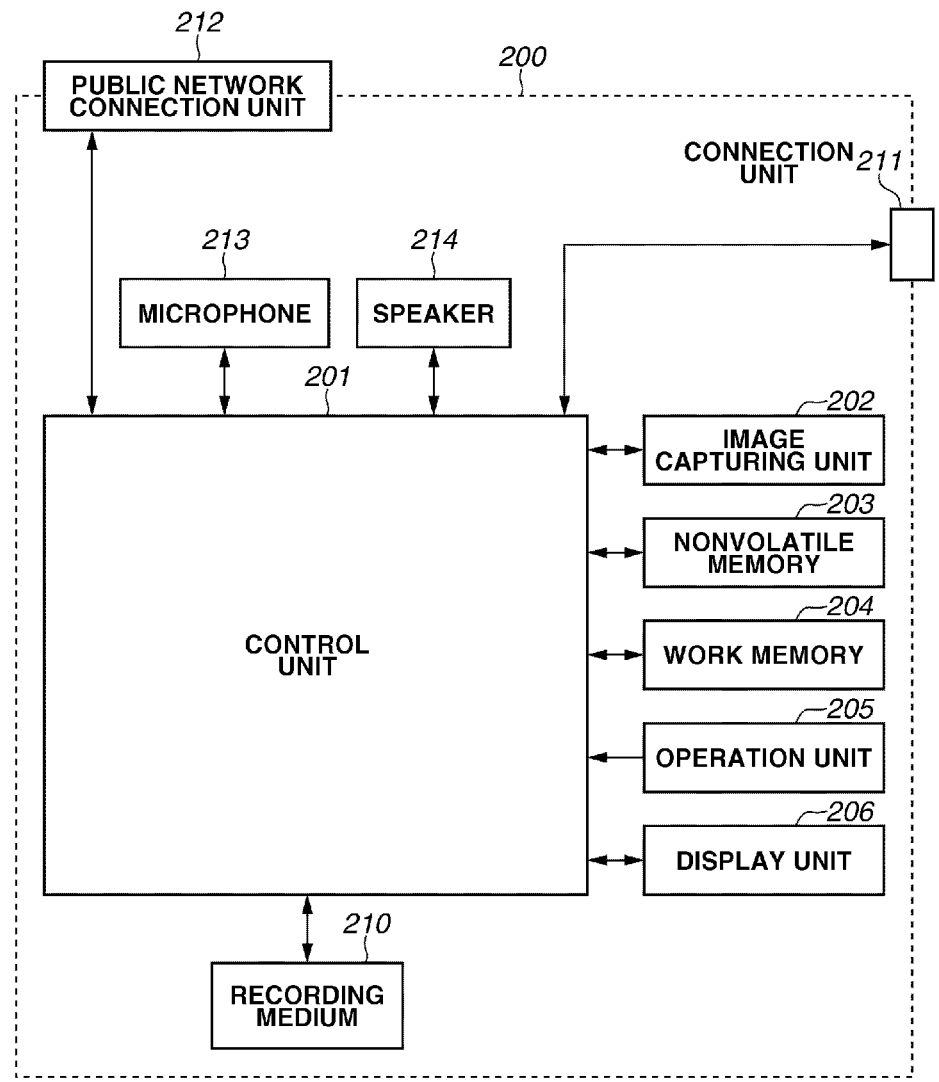
FIG. 2 is a block diagram illustrating a configuration of a mobile phone.

FIG. 2 is a block diagram illustrating a configuration example of the mobile phone 200 that is an example of the communication apparatus according to the first exemplary embodiment. The communication apparatus is not limited to being a mobile phone. For example, the communication apparatus can be a digital camera having a wireless function, a mobile type media player, a tablet device, a personal computer, etc.

A control unit 201 controls each unit of the mobile phone 200 according to an input signal or a program described below. In place of controlling the entire apparatus by the control unit 201, the entire apparatus can be controlled by sharing processing among a plurality of hardware units.

An image capturing unit 202 converts object light image-formed by a lens included therein into an electric signal, and performs noise reduction processing to output digital data as image data. The captured image data is stored in a buffer memory, and then subjected to predetermined calculation at the control unit 201 to be recorded in a recording medium 210.

A nonvolatile memory 203, which is an electrically erasable/recordable nonvolatile memory, stores various programs executed by the control unit 201. A program for communication with the digital camera 100 is also stored in the nonvolatile memory 203, and installed as a camera communication application. Processing of the mobile phone 200 in the present exemplary embodiment is realized by reading the program provided by the camera communication application. The camera communication application has a program for using a basic function of an operating system (OS) installed in the mobile phone 200. The OS of the mobile phone 200 can have a program for realizing processing in the present exemplary embodiment.

A work memory 204 is used as a buffer memory for temporarily storing the image data captured by the image capturing unit 202, an image display memory of a display unit 206, or a work region of the control unit 201.

An operation unit 205 is used for receiving an instruction given from the user to the mobile phone 200. The operation unit 205 includes, for example, a power button operated by the user to instruct power ON/OFF of the mobile phone 200, and an operation member such as a touch panel formed in the display unit 206.

The display unit 206 displays image data or a character for a dialog operation. The display unit 206 does not always need to include the mobile phone 200. The mobile phone 200 can be connected to the display unit 206, and only needs to have at least a display control function for controlling displaying of the display unit 206.

The image data output from the image capturing unit 202 can be recorded in a recording medium 210. The recording medium 210 can be configured to be detachable from or included in the mobile phone 200. In other words, the mobile phone 200 only needs to include at least a unit for accessing the recording medium 210.

A connection unit 211 is an interface for connection to the external apparatus. The mobile phone 200 according to the present exemplary embodiment can transfer data with the external apparatus via the connection unit 211. In the present exemplary embodiment, the connection unit 211 includes an interface for communication with the external apparatus via the wireless LAN. The control unit 201 controls the connection unit 211 to realize wireless communication with the external apparatus. The mobile phone 200 according to the present exemplary embodiment can operate as a slave apparatus in an infrastructure mode, and participate in a network formed by a surrounding AP.

A public network connection unit 212 is an interface used when public wireless communication is performed. The mobile phone 200 can call the other device or perform data communication via the public network connection unit 212. During calling, the control unit 201 inputs or outputs an audio signal via a microphone phone 213 or a speaker 214. In the present exemplary embodiment, the public network connection unit 212 includes an interface for performing communication using the third generation of mobile telecommunications technology (3G). Communication is not limited to 3G, and other communication methods, such as the fourth generation of telecommunications technology (4G), such as Long Term Evolution (LTE), Worldwide Interoperability for Microwave Access (WiMAX), Asymmetric Digital Subscriber Line (ADSL), or Fiber To The Home (FTTH) are applicable. The connection unit 211 and the public network connection unit 212 do not necessarily include independent hardware units. For example, one antenna can be shared. The mobile phone 200 has been described.

<Outline of Connection Form>

Figure 3A:
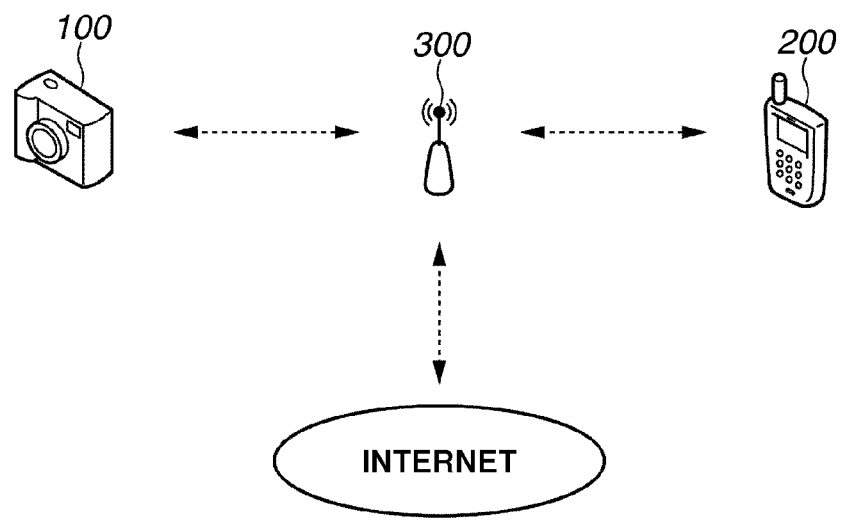
FIGS. 3A and 3B are diagrams each illustrating a network configuration.
Figure 3B:

FIGS. 3A and 3B are diagrams schematically illustrating connection forms of the digital camera 100 and the mobile phone 200 according to the present exemplary embodiment. When the digital camera 100 and the mobile phone 200 transfer data by wireless, the two connection forms illustrated in FIGS. 3A and 3B are conceivable.

FIG. 3A illustrates a form where the digital camera 100 and the mobile phone 200 participate in a wireless network formed by an external AP 300 that is an example of an external relay apparatus. The wireless network formed in this case is a wireless LAN. The digital camera 100 and the mobile phone 200 detect a beacon signal periodically transmitted from the external AP 300, and participate in the wireless network formed by the external AP 300. After having participated in the same wireless network, the digital camera 100 and the mobile phone 200 find each other's device and obtain device capabilities, and then are enabled to transfer data by the wireless LAN (establish communication between the devices).

The external AP 300 according to the present exemplary embodiment can be connected to an external network such as the Internet by using a public network. Thus, the mobile phone 200 can transmit data to the Internet via the external AP 300.

FIG. 3B illustrates a form where the digital camera 100 and the mobile phone 200 are connected to each other not via the external AP 300 but directly. In this case, the digital camera 100 operates a simple AP to form a wireless network. The digital camera 100, which has operated as the simple AP, starts periodic transmission of beacon signals. The mobile phone 200 detects the beacon signal to participate in the wireless network formed by the digital camera 100. Then, as in the case of FIG. 3A, the digital camera 100 and the mobile phone 200 find each other's device and obtain device capabilities to establish communication, and then are enabled to transfer data.

As described above, the digital camera 100 according to the present exemplary embodiment has no communication function to the external network such as the Internet. Thus, the mobile phone 200 participating in the wireless network formed by the digital camera 100 cannot transfer data to the Internet via the simple AP.

As described above, there are two connection forms of digital camera 100 and the mobile phone 200. Hereinafter, connection processing in these two connection forms will be described.

<Connection Processing>

The digital camera 100 according to the present exemplary embodiment has two operation methods for starting connection with the mobile phone 200. The first is a method for starting connection by operating the operation unit 105 displayed on the display unit 106. The second is a method for operating a connection button that is a dedicated button for starting connection with the other device once connected. The connection button is one of hardware keys included in the operation unit 105. The digital camera 100 according to the present exemplary embodiment includes the connection starting method based on the connection button in addition to the menu operation for the following reason. Conventionally, even when the user operates his own mobile phone 200 to view/receive image data from the digital camera 100, the user must first hold the digital camera 100 by hand to operate it. This imposes switching time and labor. To solve this problem for easier connection, a dedicated hardware key for starting connection to the digital camera 100 is provided. This enables the user to connect to the mobile phone 200 only by operating the hardware key of the digital camera 100 while watching the menu of the digital camera 100 without performing an operation. For the purpose of easier connection, the digital camera 100 according to the present exemplary embodiment can be set in a power-ON state not only by operating the power button included in the operation unit 105 but also by operating the connection button. In other words, communication can be started with the mobile phone 200 without any need to operate the power button.

First, processing for starting connection by the menu operation, which is the first connection method, will be described. FIG. 4A is a flowchart illustrating processing of the digital camera 100 when connection with the mobile phone 200 is started by operating the menu. The processing of the flowchart is realized by controlling, by the control unit 101 of the digital camera 100, each unit of the digital camera 100 according to an input signal or a program. Unless otherwise specified, the other flowchart indicating processing of the digital camera 100 is similar. The processing of the present flowchart is started in response to an instruction given from the user of the digital camera 100 for connection to the other apparatus by a menu operation via the operation unit 105.

Figure 5A:
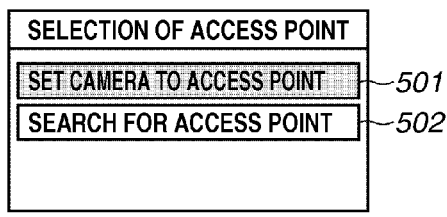
FIGS. 5Aa, 5Ab, 5Ac, 5Ad, 5Ae, and 5Af are diagrams illustrating examples of display screens of the digital camera and the mobile phone.
Figure 5A:
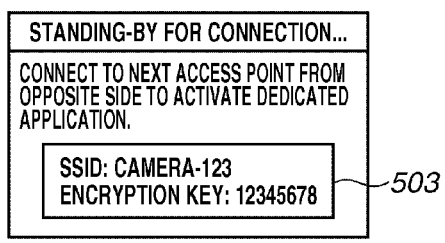
Figure 5A:
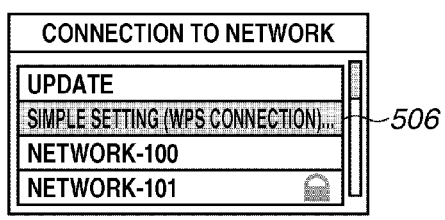
Figure 5A:
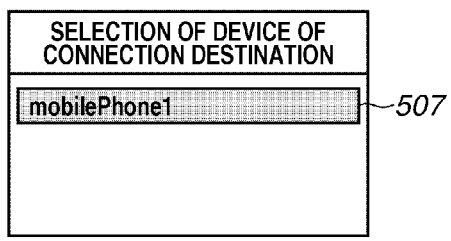
Figure 5A:
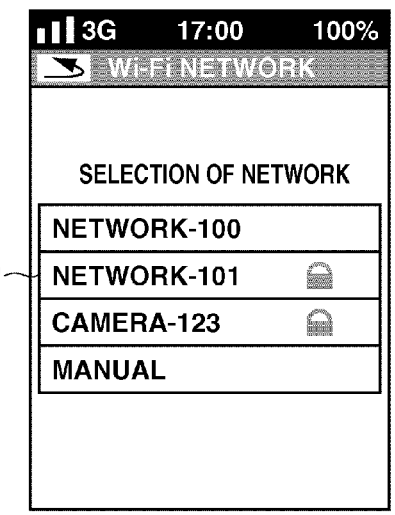
Figure 5A:
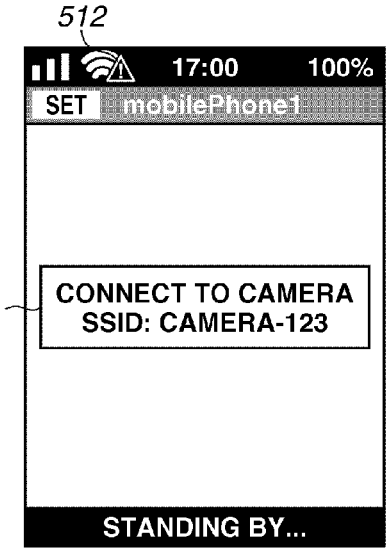

In step S400 illustrated in FIG. 4A, the control unit 101 displays, on the display unit 106, a screen for selecting participation in the wireless network formed by the external AP or an operation of the own apparatus as a simple AP. FIG. 5Aa illustrates an example of the screen displayed in this step.

In step S401, when it is determined that the button 501 has been selected by a user's operation, the control unit 101 determines that formation of a wireless network has been selected, and the processing proceeds to step S402. When it is determined that the button 502 has been selected by a user's operation, the control unit 101 determines that participation in the wireless network formed by the external AP has been selected, and the processing proceeds to step S403.

In step S402, the control unit 101 forms a wireless network. Specifically, the control unit 101 generates ESSID, BSSID, an authentication method, an encryption type, and an encryption key necessary for forming the network. The control unit 101 displays at least the ESSID and the encryption key as information needed by a connected device to participate in the network. FIG. 5Ab illustrates an example of the displaying. The encryption key or the ESSID can be generated for each connection or each connected device, or always similar. In this step, to enable communication with the other device, the control unit 101 performs IP address allocation and subnetwork setting, and the processing proceeds to step S403.

On the other hand, proceeding to step S403, the control unit 101 scans a surrounding wireless network, and displays a list of ESSIDs included in a beacon signal detected as a result on the display unit 106. FIG. 5Ac illustrates an example of a screen in this case. In the example illustrated in FIG. 5Ac, ESSIDs of "NETWORK-100" and "NETWORK-101" are detected. After the wireless network has been selected from the list illustrated in FIG. 5Ac by a user's operation, the control unit 101 participates in the selected wireless network, in other words, performs connection processing to the AP.

Further, to enable communication with the other device, the control unit 101 performs IP address allocation and subnetwork setting, and the processing proceeds to step S404.

In step S404, the control unit 101 searches for devices connectable in the same network. To enable the digital camera 100 to search for the mobile phone 200, an operation is necessary on the mobile phone 200 side. Hereinafter, referring to FIGS. 5Aa, 5Ab, 5Ac, 5Ad, 5Ae, and 5Af, and FIGS. 5Ba and 5Bb, the operation on the mobile phone side 200 will be described. FIGS. 5Ba and 5Bb are flowcharts illustrating processing of the mobile phone 200 according to the present exemplary embodiment. The processing of the flowchart is realized by controlling, by the control unit 201 of the mobile phone 200, each unit of the mobile phone 200 according to an input signal or a program. Unless otherwise specified, the other flowchart indicating processing of the mobile phone 200 is similar.

First, in step S551, in response to a predetermined operation performed by the user of the mobile phone 200, the control unit 201 displays, on the display unit 206, a screen for selecting a wireless network for participation. After having transitioned to the screen, the control unit 201 scans a surrounding wireless network, and displays a list 510 of ESSIDs detected as a result. FIG. 5Ae illustrates an example of the screen. In the present exemplary embodiment, these processes are performed by the function of the OS of the mobile phone 200 before activation of the camera communication application. However, the camera communication application activated beforehand can perform the processes cooperatively with the function of the OS. When the digital camera 100 operates as a simple AP, the mobile phone 200 detects ESSID of the digital camera 100 to display it in the list 510. In FIG. 5Ae, "CAMERA-123" is displayed as ESSID of the digital camera 100.

In step S552, the control unit 201 stands by for selecting any one of ESSIDs in the list 510. After any one of ESSIDs has been selected by a user's operation, in step S553, the control unit 210 performs participation processing in a corresponding wireless network. This completes participation in the network.

After the participation in the network, the user of the mobile phone 200 activates the camera communication application installed in the mobile phone 200. Processing of the mobile phone 200 after the camera communication application has been activated will be described referring to a flowchart illustrated in FIG. 5Bb. Main functions of the camera communication application include a function of establishing communication with a digital camera present in the same network, a function of transferring content data such as image data, and a function of controlling processing for transmitting content data of its own device to a server.

After the camera communication application has been activated by the user's operation, in step S571, a standby screen similar to that illustrated in FIG. 5Af is displayed on the display unit 206. In a dialog 511, SSID of a network of current participation is displayed. In an example illustrated in FIG. 5Af, "CAMERA-123" is selected on the screen illustrated in FIG. 5Ae. After the activation of the camera communication application, service notification of the own device is performed via the wireless network so that the digital camera 100 can detect the mobile phone 200. The digital camera 100 can detect the mobile phone 200 based on the service notification. The service notification includes a device name and UUID of the mobile phone 200. In step S572, the control unit 201 stands by for a connection request from the digital camera 100. When it is determined that there is a connection request (YES in step S572), in step S573, communication with the digital camera 100 will be established.

Referring back to FIG. 4A, in step S404, the control unit 101 searches for connectable devices present in the same network. As described above, if the service notification has been performed on the mobile phone 200 side, the digital camera 100 can detect the mobile phone 200. When a connectable device is detected as a result of the searching, the control unit 101 displays a device name included in the service notification in the list on the display unit 106. FIG. 5Ad illustrates an example of the list displaying. The UUID and the device name included in the service notification are associated with each other to be stored in the work memory 104.

In the present exemplary embodiment, the configuration where the service notification includes the device name and the UUID is employed. However, a configuration where the digital camera 100 that has received the service notification makes inquiries about the device name and the UUID to the mobile phone 200 can be employed.

In step S405, the control unit 101 receives a user's operation for selecting one of the device names displayed in the list in step S404.

In step S406, the control unit 101 transmits a connection request to the mobile phone 200 by using the UUID of the device selected in step S405, and starts processing for establishing communication with the selected device. In the present exemplary embodiment, connection is performed by using the UUID of the opposite device. However, the connection can be made by specifying an IP address or a port number from the UUID, or an IP address can be obtained at the time of searching. After the communication has been established, the processing proceeds to step S407.

In step S407, the control unit 101 notifies the mobile phone 200 communication with which has been established in step S406 of whether the wireless network of current participation has been formed by a simple AP. Specifically, when the own device functions as a simple AP, and the mobile phone 200 is participating in the wireless network of the own device, the digital camera 100 notifies the mobile phone 200 of formation of the wireless network by the own device. On the other hand, when the mobile phone 200 is participating in a wireless network formed by the other device, the digital camera 100 notifies the mobile phone 200 of nonformation of the wireless network by the own device. Through this notification, the mobile phone 200 can determine which of the wireless network formed by the digital camera 100 and the wireless network formed by the other AP it is participating in. Based on this notification, the mobile phone 200 can determine whether communication can be performed from the wireless network in which the own device is participating to an external network. The notification is received by the control unit 201 in step S574 illustrated in FIG. 5Bb. As a result, the mobile phone 200 changes displaying of an icon indicating a type or a status of communication according to a content of the notification as in the case of an icon 512 illustrated in FIG. 5Af. The icon 512 illustrated in FIG. 5Af is an example when a network of current participation is a network generated by operating the digital camera 100 as a simple AP.

Then, in step S408 illustrated in FIG. 4A, connection information including network information and connected device information are stored in the nonvolatile memory 103. The network information includes, for example, ESSID, BSSID, an authentication method, an encryption type, an encryption key, and information indicating whether the wireless network has been formed by the own device. The connected device information includes a device name and UUID of the connection opponent.

In step S409, the control unit 101 transmits information indicating that wireless connection has been started by a menu operation to the mobile phone 200.

Lastly, in step S410, the control unit 101 displays a message indicating ongoing connection with the mobile phone 200 on the display unit 106, and then ends the processing of the flowchart.

The first method for starting connection by the menu operation has been described.

Next, the second method will be described. FIG. 4B is a flowchart illustrating processing of the digital camera 100 when connection with the mobile phone 200 is started by operating the connection button. When the connection button is pressed, if power has been ON, the processing is started with step S450. If the power has been OFF, the processing is started with step S450 after energization to at least the control unit 101, the connection unit 111, and the display unit 106 is started.

First, in step S450, the control unit 101 determines whether connection history information has been stored in the nonvolatile memory 103. A case where it is determined that the connection history information has been stored will be described. In this case, the processing proceeds to step S451.

In step S451, the control unit 101 connects to a last connected network based on network information of the connection history information. When it is determined that the last connected network has been formed by the other AP, the control unit 101 participates in the network of the AP by using ESSID, BSSID, an authentication method, an encryption type, and an encryption key. On the other hand, when it is determined that the last connected network is a network generated by operating the digital camera 100 as a simple AP, a network similar to that of last time is generated by using ESSID, BSSID, an authentication method, an encryption type, and an encryption key.

In step S452, the control unit 101 displays a screen indicating ongoing connection according to last connection history. Specifically, the control unit 101 refers to information indicating whether a wireless network included in network information of connection history information has been formed by the own device. As a result, when it is determined that a last connected network has been formed by the other AP, the control unit 101 displays the screen indicating ongoing connection. On the other hand, when it is determined that the last connected network is a network generated by operating the digital camera 100 as a simple AP, a screen illustrated in FIG. 5Ab is displayed.

Subsequently, in step S453, the control unit 101 searches for devices matching device information included in the connection history information and present in the network. The user operates the mobile phone 100, and performs the processing illustrated in FIG. 4B to participate in the network in which the digital camera 100 is participating or the network generated by the digital camera 100.

In step S454, the control unit 101 determines, as a result of the searching, whether the devices matching the device information included in the connection history information are present. When it is determined that no device matching the device information included in the connection history information is found even when searched for a predetermined period of time (NO in step S454), in step S459, determining that no device is present in the network, the control unit 101 displays an error on the display unit 106 for a certain period of time. Then, the processing proceeds to step S460, and the control unit 101 turns OFF power for the digital camera 100 to end the processing of the flowchart. When the power for the digital camera 100 is ON before the connection button is operated, the processing can return to the original screen without turning OFF power in this step. On the other hand, when the control unit 101 determines that a device matching the device information included in the connection history information has been found (YES in step S454), the processing proceeds to step S455.

In steps S455 and S456, the control unit 101 performs processing similar to that of steps S406 and S407.

In subsequent step S457, the control unit 101 transmits information indicating that the wireless connection has been started by the connection button to the mobile phone 200.

In step S458, the control unit 101 displays a name of the connection opponent, and notifies the user of communication establishment. This displaying can be performed in parallel with the processing of steps S455 to S457. Unlike the case of starting the communication based on the menu operation, the displaying in the processing of this step is ended after continued performance of a predetermined period of time, and the control unit 101 stops the energization to the display unit 106. This is based on the assumption that in the case of connection by the connection button as described above, the mobile phone 200 is operated to control communication between the digital camera 100 and the mobile phone 200. On the other hand, when it is determined that no connection history information is stored (No in step S450), the processing proceeds to step S470.

In steps S470 to S476, processing similar to that of steps S400 to S406 is performed. In subsequent step S477, processing similar to that of step S408 is performed. Then, the processing proceeds to step S456. Processing thereafter is as described above.

The second connection method has been described. As described above, as long as he first operates the connection button, the user can start communication only by operating the mobile phone 200 without operating the digital camera 100 thereafter.

<Operation of Mobile Phone After Connection>

Figure 6A:
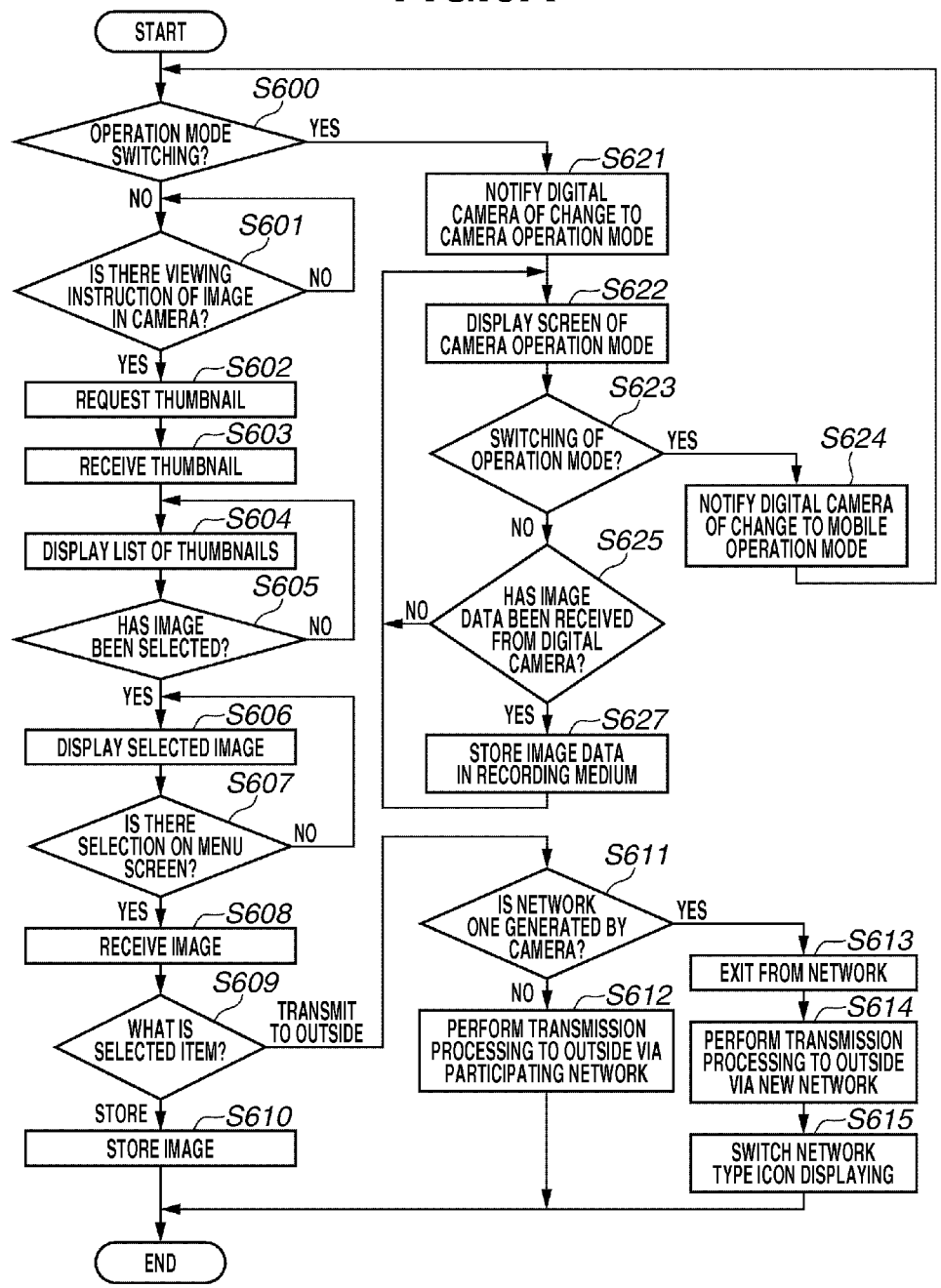
FIG. 6A is a flowchart illustrating an operation of the mobile phone.

Next, an operation of the mobile phone 200 after the communication with the digital camera 100 has been established will be described. FIG. 6A is a flowchart illustrating the operation of the mobile phone 200 after the communication with the digital camera 100 has been established.

Figure 7A:
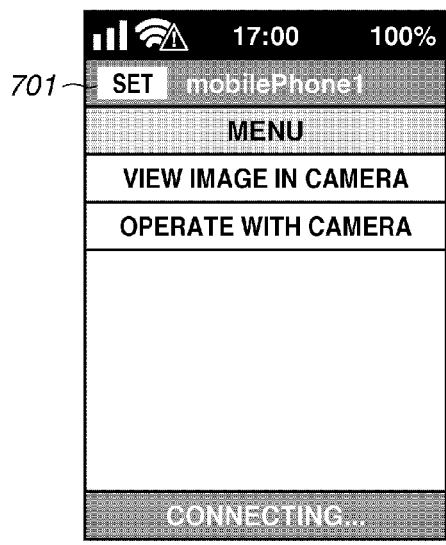
FIGS. 7A, 7B, 7C, 7D, 7E, 7F, and 7G are diagrams illustrating examples of display screens of the mobile phone.

After the communication with the digital camera 100 has been established, the control unit 201 of the mobile phone 200 changes a screen displayed on the display unit 206 from the screen illustrated in FIG. 5Af to the menu screen of the camera communication application illustrated in FIG. 7A. A setting button 701 and a viewing button 702 are displayed on the menu screen. The setting button 701 is a button for setting a device name of the mobile phone 200 or performing various setting operations in uploading. The viewing button 702 is a button for displaying image data stored in the digital camera 100 with which the communication has been established on the display unit 206. Further, if the established communication has been started by the menu operation via the display unit 106 of the digital camera 100, an operation mode switching button 715 is also displayed. Determination as to how the established communication has been started is performed by the control unit 201 while referring to information transmitted from the digital camera 100 in step S408 illustrated in FIG. 4A or step S456 illustrated in FIG. 4B. The operation mode switching button 715 is a button for switching a mode between a mobile operation mode for receiving image data from the digital camera 100 by operating the mobile phone 200 and a camera operation mode for transmitting the image data by operating the digital camera 100. In the present exemplary embodiment, devices that are main operation actors in neither of the modes are set in states where basically any instruction of the image data cannot be input. If the established communication has been started by operating the connection button, the operation mode switching button 715 is not displayed. In other words, when communication is started by operating the connection button, an instruction of the image data is basically input by operating the mobile phone 200. In the present exemplary embodiment, in any of the communication starting methods, a mode after the communication has been established is a mobile operation mode.

In step S600, the control unit 101 determines whether the operation mode switching button 715 has been selected. As described above, the operation mode switching button 715 may not be displayed. In such a state, the processing can be started with step S601 without executing step S600 itself.

First, a case where the operation mode switching button 715 is not selected, in other words, an operation in the mobile operation mode, will be described. In this case, the processing proceeds to step S601.

In step S601, the control unit 101 determines whether the viewing button 702 has been selected. When it is determined that the viewing button 702 has been selected (YES in step S601), the processing proceeds to step S602. When it is determined that the viewing button 702 has not been selected (NO in step S601), the processing is repeated.

In step S602, the control unit 201 requests, to the digital camera 100, thumbnails of image data owned by the digital camera 100. In response to the request, the digital camera 100 transmits the requested thumbnails to the mobile phone 200. The thumbnails can be repeatedly requested one by one, or a command for collectively requesting a plurality can be transmitted.

In step S603, the mobile phone 200 receives the thumbnails transmitted from the digital camera 100 via the connection unit 211 of the mobile phone 200.

Figure 7B:
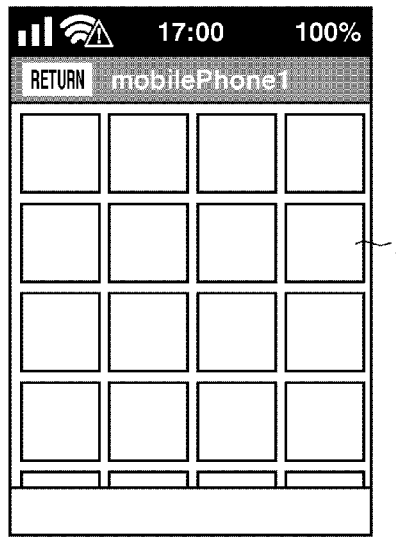

In step S604, the control unit 201 displays a list of the received thumbnails on the display unit 206. FIG. 7B illustrates an example of a display screen. In the example illustrated in FIG. 7B, the thumbnails are displayed in four columns, and other image data can be displayed by a vertical scroll operation.

In step S605, the control unit 201 determines whether any one of the displayed list of thumbnails has been selected. When it is determined that one has been selected (YES in step S605), the processing proceeds to step S606. When otherwise (NO in step S605), the processing returns to step S604.

Figure 7C:
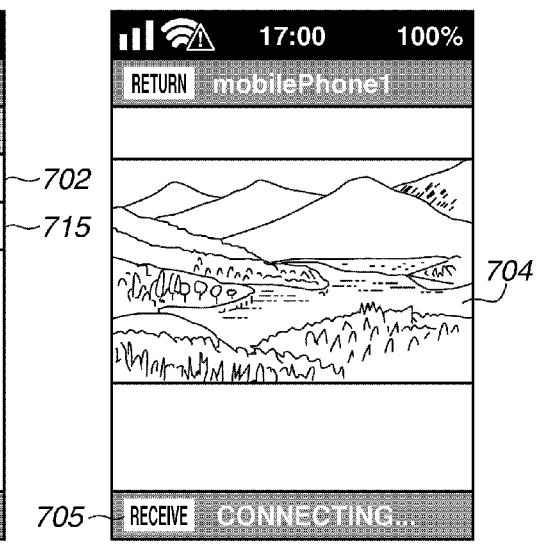

In step S606, the control unit 201 displays the selected thumbnail in a large size. FIG. 7C illustrates an example of displaying. As illustrated in FIG. 7C, the selected thumbnail is displayed in a size larger than that illustrated in FIG. 7B. The selected thumbnail is directly displayed in the large size in step S606. However, in view of displaying with a large size, a larger thumbnail or the image data can be requested to the digital camera 100.

The screen illustrated in FIG. 7C includes a receiving button 705. The receiving button 705 is a button for receiving the image data corresponding to the displayed thumbnail from the digital camera 100, and performing predetermined processing for the received image data.

Figure 7D:
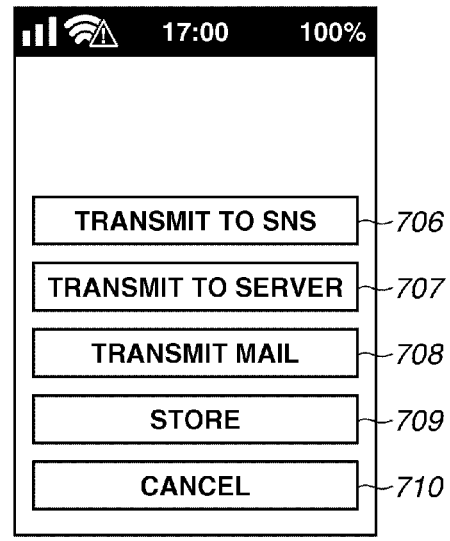

When the button 705 is selected by a user's operation, the control unit 201 translucently displays a menu illustrated in FIG. 7D and superimposed on the image data. Hereinafter, buttons included in the menu will be described.

A button 706 is a button for uploading the image data received from the digital camera 100 to a social network service (SNS). The user of the mobile phone 200 sets an SNS of an uploading destination beforehand. When the button 706 is selected, processing for transmitting the image data to a server provided by the SNS is started. Processing for setting an SNS of an uploading destination can be started in response to selection of the button 706.

A button 707 is a button for uploading the image data received from the digital camera 100 to a content server. The user of the mobile phone 200 sets a content server of an uploading destination beforehand. When the button 707 is selected, processing for transmitting the image data to the content server via the Internet is started. Processing for setting the content server of the uploading destination can be started in response to selection of the button 707.

A button 708 is a button for attaching the image data received from the digital camera 100 to mail to transmit it. When the button 708 is selected, the control unit 201 activates a mail application to provide a pattern of mail having the received image data attached thereto. The user of the mobile phone 200 can transmit, after inputting a desired sentence, the mail to an arbitrary address via the Internet.

A button 709 is a button for recording the image data received from the digital camera 100 in the recording medium 210. When the button 709 is selected, the image data received from the digital camera is recorded in the recording medium 210.

A button 710 is a cancel button. When this button is selected, the menu illustrated in FIG. 7D is deleted, and the displaying returns to the state illustrated in FIG. 7C.

Then, in step S607, the control unit 210 determines whether any one of the buttons 706 to 709 among the buttons illustrated in FIG. 7D has been selected. When it is determined that one of the buttons 706 to 709 has been selected (YES in step S607), the processing proceeds to step S608. When it is determined that the button 710 has been selected (NO in step S607), the processing returns to step S606.

Figure 7E:
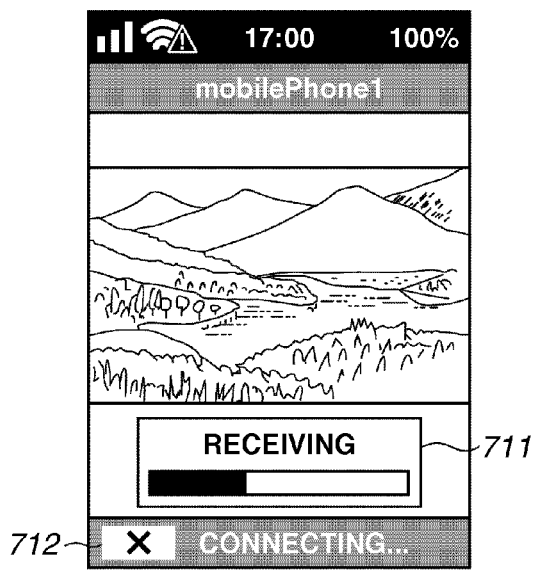

In step S608, the control unit 201 requests the image data corresponding to the thumbnail selected in step SD605 to the mobile phone 200. After having transmitted the image data in response to the request to the digital camera 100, the mobile phone 200 receives the image data to store it in the work memory 204. During reception of the image data, a screen illustrated in FIG. 7E is displayed on the display unit 206. The user of the mobile phone 200 can cancel the reception by selecting a button 712 illustrated in FIG. 7E.

After the reception of the image data has been completed, the processing proceeds to step S609, and the control unit 201 determines which processing has been selected in step S607. When it is determined that one of the buttons 706, 707, and 708 has been selected, in other words, an operation of transmitting the received image data to the outside has been selected, the processing proceeds to step S611. On the other hand, when it is determined that the button 709 has been selected, in other words, an operation of storing the received image data in the recording medium 210 without transmitting it to the outside has been selected, the processing proceeds to step S610.

First, a case where the processing proceeds to step S610 will be described. In step S610, the control unit 201 stores the image data received in step S608 from the work memory 204 to the recording medium 210, and the processing is ended.

Next, a case where the processing proceeds to step S611 will be described. In step S611, the control unit 201 determines whether a network of current participation is a network formed by the simple AP function of the digital camera 100. The control unit 201 performs the determination of this step by referring to the notification received from the digital camera in step S406. When it is determined that the network is not a network formed by the simple AP function of the digital camera 100 (NO in step S611), the processing proceeds to step S612. When it is determined that the network is a network formed by the simple AP function of the digital camera 100 (YES in step S611), the processing proceeds to step S613.

First, a case where the processing proceeds to step S612 from step S611 will be described. In this case, the control unit 201 determines that the network in which the own device is currently participating is a network formed not by the simple AP function but by an external AP. In other words, a connection state similar to that illustrated in FIG. 3A is determined. In this case, the mobile phone 200 can transmit the image data. The control unit 201 accordingly transmits predetermined transmission destination information (uniform resource locator (URL) or mail address) received via the Internet and the image data received in step S608 to the external AP. Thus, the image data is transmitted from the external AP to a predetermined transmission destination.

Next, a case where the processing proceeds to step S613 from step S611 will be described. In this case, the control unit 201 determines that a current connection state is similar to that illustrated in FIG. 3B. In this case, the mobile phone 200 cannot transmit the image data to an external network via the AP while it is connected to the network formed by the AP. Accordingly, in this step, the mobile phone 200 exits from the network in which it is currently participating to disconnect from the AP (digital camera 100).

In step S614, the control unit 201 transmits the image data to the outside by a communication method not via the digital camera 100. In the present exemplary embodiment, the image data is transmitted by communication via a 3G network using the public network connection unit 212.

Then, in step S615, the control unit 201 switches a state of displaying a network type icon meaning inhibition of Internet connection because of the simple AP to a newly connected network type icon.

As another exemplary embodiment, connection can be made to a network formed by an AP other than the digital camera 100 by using the connection unit 211, and the image data can be transmitted via the AP. If the data transmission by the public network connection unit 212 and the data transmission by the connection unit 211 can be performed in parallel, in step S613, the data transmission can be performed by the public network connection unit 212 without exiting from the network.

Figure 7G:
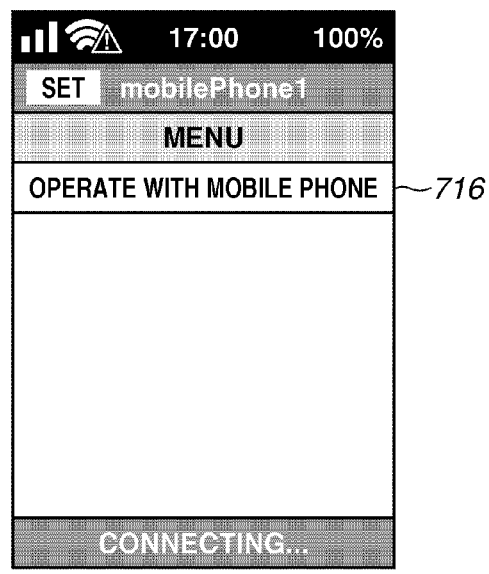
Figure 7F:
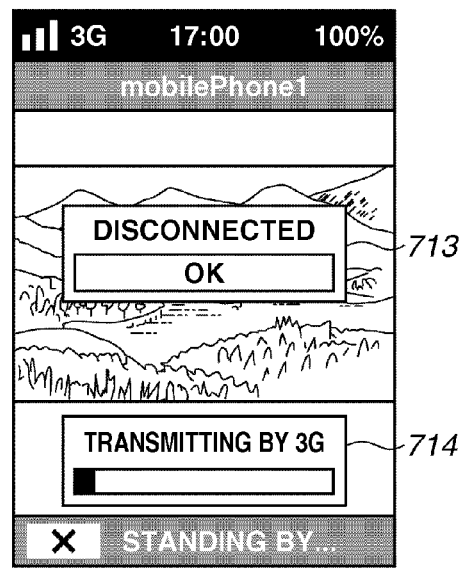

FIG. 7F illustrates a screen displayed on the display unit 206 during the processing in steps S613 and S614. On the screen illustrated in FIG. 7F, connection cut off from the network formed by the digital camera 100, in which the mobile phone 200 has participated thus far, is notified to the user by a dialog 714. A reason for this is as follows. When only a dialog 713 is displayed, there is a possibility that the user may think he will not be able to transmit the image data in this state. Thus, in the present exemplary embodiment, a dialog indicating ongoing transmission is displayed together with a dialog indicating cutting-off from the network.

A method for exiting from the network when the data cannot be transmitted for a certain period of time or by a certain number of times in step S612 without performing determination in step S612 may be employed. In this case, however, there is a high possibility of long time before exiting from the network, and a communication amount may increase. Thus, more desirably, whether the network is a network formed by the simple AP is notified beforehand from the digital camera 100 to the mobile phone 200.

A screen for adding a comment or a title to the image data or setting SNS (e.g., a share range or a selection of albums) before transmission of the image data in steps S613 and S614 can be displayed.

The example where one image data is received from the digital camera 100 and transmitted from the mobile phone 200 has been described. However, a plurality of image data can be received by the mobile phone 200, and sequentially transmitted to the external network. Image data can be received first, and then which of the image data is transmitted from the mobile phone 200 can be selected.

The processing when the operation mode switching button 715 is not selected in step S600 has been described.

Next, an operation when it is determined that the operation mode switching button 715 has been selected (YES in step S600), in other words, in the camera operation mode, will be described. In this case, the processing proceeds to step S621.

In step S621, the control unit 201 notifies the digital camera 100 of changing to the camera operation mode. Accordingly, the digital camera 100 can recognize that the changing of an operation actor has been instructed.

In step S622, the control unit 201 changes the displaying on the display unit 206 from the screen illustrated in FIG. 7A to a screen illustrated in FIG. 7G. On the screen illustrated in FIG. 7G, as in the case of the screen illustrated in FIG. 7A, an operation mode switching button 716 is displayed. However, the viewing button is not displayed any more. Thus, the mobile phone 200 is set in a state of being unable to receive an instruction of obtaining the image data of the digital camera 100 from the user. On the screen, a message prompting an operation of the digital camera 100 can be displayed.

In subsequent step S623, the control unit 201 determines whether the operation mode switching button 716 has been selected.

When it is determined that the operation mode switching button 716 has been selected (YES in step S623), the processing proceeds to step S624. In step S624, the control unit 201 notifies the digital camera 100 of changing to the mobile operation mode. Accordingly, the digital camera 100 can recognize that changing of the operation actor has been instructed again. Then, the processing returns to step S600.

On the other hand, when it is determined that the operation mode switching button 716 has not been selected (NO in step S623), the processing proceeds to step S625. In step S625, the control unit 201 determines whether the image data has been received from the digital camera 100. When it is determined that the image data has not been received (NO in step S625), the processing returns to step S622. When it is determined that the image data has been received (YES in step S625), the processing proceeds to step S626. In step S626, the received image data is recorded in the recording medium 210. Then, the processing returns to step S622.

The processing when it is determined in step S600 that the operation mode switching button 715 has been selected has been described.

Next, a detailed operation on the digital camera 100 side will be described. FIG. 6B is a flowchart illustrating an operation of the digital camera 100 after connection with the mobile phone 200.

In step S651, the control unit 101 of the digital camera 100 determines whether a request has been received from the mobile phone 200 via the connection unit 111. The processing proceeds to step S654 when it is determined that a request has been received (YES in step S651), and to step S652 when otherwise (NO in step S651).

A case where the processing proceeds to step S654 will be described. In step S654, the control unit 101 determines whether the request received in step S651 is a thumbnail request (request transmitted in step S602). When it is determined that the request is a thumbnail request (YES in step S654), the processing proceeds to step S655. When determined otherwise (NO in step S654), the processing proceeds to step S657.

A case where the processing proceeds to step S655 will be described. In step S655, the control unit 101 searches for, among image data stored in the recording medium 110, image data requested from the mobile phone 200, and reads a thumbnail corresponding to the retrieved image data in the work memory 104. Needless to say, a plurality of thumbnails can be read. In this case, a thumbnail already associated with the image data can be used or a new thumbnail can be generated.

In step S656, the control unit 101 transmits the thumbnail stored in the work memory 104 to the mobile phone 200 that has requested the thumbnail, and the processing returns to step S651. As a result of this processing, on the mobile phone 200 side, thumbnail reception processing of step S603 is performed. The processing of transmitting the thumbnail from the digital camera 100 to the mobile phone 200 has been described.

A case where the processing proceeds to step S657 will be described. In step S657, the control unit 101 determines whether the request received in step S651 is a request of image data corresponding to the thumbnail (a request transmitted in step S607). When it is determined that the request is a request of image data (YES in step S657), the processing proceeds to step S658. When determined otherwise (NO in step S657), the processing proceeds to step S810.

First, a case where the processing proceeds to step S658 will be described. In step S658, the control unit 101 searches for requested image data among the image data stored in the recording medium 110, and reads the retrieved image data in the work memory 104.

Then, in step S659, the control unit 101 transmits the image data stored in the work memory 104 to the mobile phone 200, and the processing returns to step S651. As a result of this processing, on the mobile phone 200 side, image data reception processing of step S608 is performed.

On the other hand, when the processing proceeds to step S810, determining that the own device cannot appropriately respond to the received request, the control unit 101 transmits an error notification indicating this to the digital camera 100.

Next, a case where the processing proceeds from step S651 to step S652 will be described. In step S652, the control unit 101 determines whether the connection has been cut off. The following cases where the connection is determined to have been cut off in this step are conceivable: a case where communication established with the mobile phone 200 has been cut off, a case where the mobile phone 200 is not present any more in the network, and a case where the own device is unable to receive any beacon signal from the AP to lose sight of the network. When the own device is operating as a simple AP, the network is not lost sight of. When it is determined that the connection has been cut off (YES in step S652), the processing proceeds to step S653. When determined otherwise, (NO in step S652), the processing returns to step S651.

In step S653, the control unit 101 determines whether the own device is operating as a simple AP. When it is determined that the own device is not operating as a simple AP (NO in step S653), the processing proceeds to step S661. When it is determined that the own device is operating as a simple AP (YES in step S653), the processing proceeds to step S662.

In step S661, the control unit 101 performs exiting processing from the network in which it is currently participating. On the other hand, in step S662, the control unit 101 deletes the network currently formed by the own device. Specifically, the control unit 101 stops transmission of the beacon signal, and broadcasts, to the network, a notification indicating deletion of the network.

The processing of transmitting the image data from the digital camera 100 to the mobile phone 200 has been described.

<Operation When Application of Mobile Phone is Switched>

The operation when the mobile phone 200 activates the camera communication application and the communication is performed with the digital camera 100 according to the control of the camera communication application has been described. The mobile phone 200 according to the present exemplary embodiment can store not only the camera communication application but also programs of various functions in the nonvolatile memory 203 to use them as a plurality of applications. These applications can be switched based on a user's operation or the like. Thus, before processing of the digital camera 100 corresponding to the operation of the mobile phone 200 is described, processing when the camera communication application and the other application are switched will be described.

FIGS. 8A to 8E illustrate an outline of application switching in the mobile phone 200 according to the present exemplary embodiment.

Figure 8A:
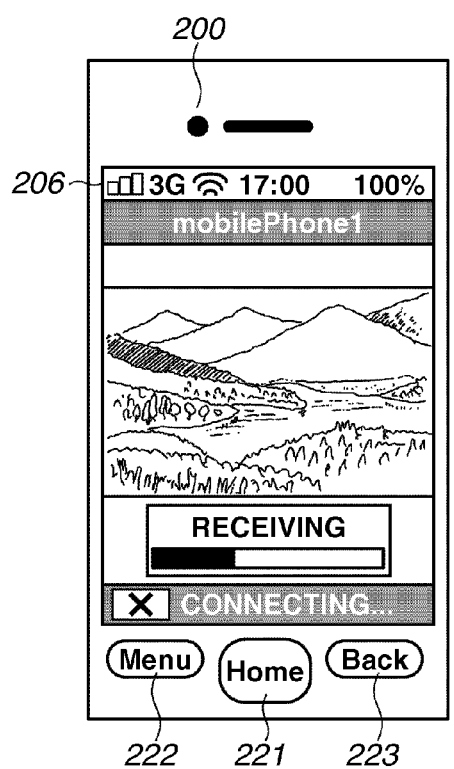
FIGS. 8A, 8B, 8C, 8D, and 8E are diagrams illustrating examples of display screens of the mobile phone.

FIG. 8A illustrates an appearance example of the mobile phone 200 in a state where the camera communication application is activated. A screen illustrated in FIG. 8A is only an example of a display screen. As described above, when the camera communication application is activated, the screens illustrated in FIGS. 7A to 7F are displayed.

FIG. 8A further illustrates an appearance of the mobile phone 200. The display unit 206 includes a touch panel as an example of the operation unit 205. The mobile phone 200 further includes, as examples of the operation unit 205, a "home" button 221, a "menu" button 222, and a "return" button 223.

The mobile phone 200 according to the present exemplary embodiment manages applications based on a concept of a foreground and a background. An application present in the foreground indicates an application displayed on the display unit 206. When the application is present in the foreground, the mobile phone 200 can receive an operation from the user via the operation unit 205 of the mobile phone 200. An application present in the background indicates an application not displayed on the display unit 206 but activated. When the application is present in the background, operations receivable via the operation unit 205 of the mobile phone 200 are limited. For example, only an end of the application is received.

Figure 8B:
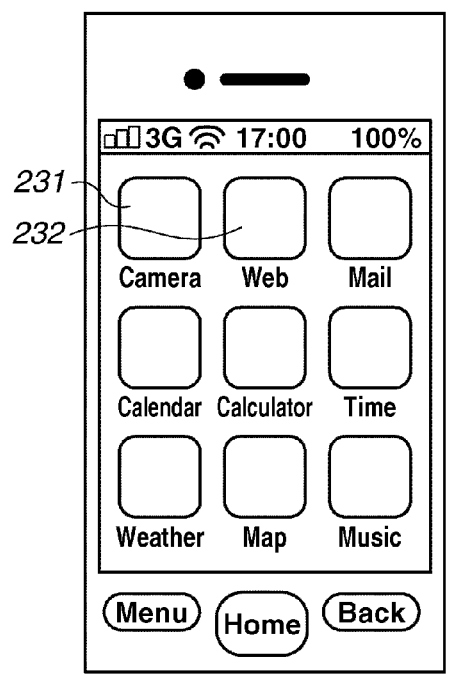

The mobile phone 200 according to the present exemplary embodiment can cause, even during execution of a predetermined application in the foreground, the screen of the currently executed application to transition to the background by pressing the "home" button 221. In this case, a screen referred to as a home screen is displayed in the foreground. FIG. 8B illustrates a screen example of the home screen. On the home screen, a list of buttons indicating respective applications is displayed. When a button is selected by a user's operation, each application can be activated, or a currently activated application can be called up. For example, a button 231 is a button for the camera communication application, and a button 232 is a button of a web browser application for performing Internet browsing.

Figure 8C:
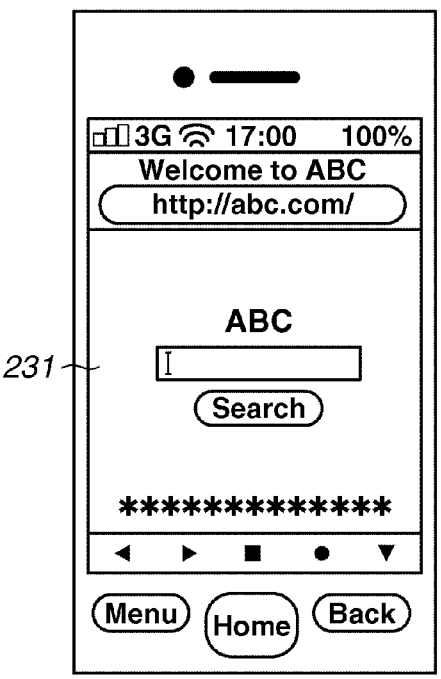

When the user selects the button 232 of the web browser application on the home screen illustrated in FIG. 8B, as illustrated in FIG. 8C, the web browser application is activated, a screen 231 of the web browser application is displayed. When the web browser application is yet to be activated, a web browser application is newly activated and is caused to transition to the foreground, and a screen is displayed. On the other hand, when the web browser application has been activated, a screen of the web browser application present in the background is caused to transition to the foreground, thereby displaying the web browser application screen again.

The mobile phone 200 according to the present exemplary embodiment can call up, by using the "return" button 223, an application displayed in the foreground immediately before a current operation. In this case, a screen of an application present in the background is caused to transition to the foreground, and a screen of a currently displayed application is caused to transition to the background.

A case where the camera communication application of the present exemplary embodiment transitions from the foreground to the background will be described. The mobile phone 200 according to the present exemplary embodiment varies processing at the time of application switching based on whether a network of current participation is a network formed by the digital camera 100 as a simple AP.

First, when participation in the network performed by the simple AP is determined, the mobile phone 200 causes the camera communication application to transition to the background. The mobile phone 200 then exits from the network of current participation to be connected to the other surrounding network. A reason for this is as follows. Many of applications installed in the mobile phone 200 use the Internet. When the mobile phone 200 is switched to such an application, if the mobile phone 200 still participates in the network formed by the simple AP, it is inconvenient because the Internet cannot be used. Processing for participating in a new network after exiting from the network can be automatically performed after the exiting, or performed after the exiting according to a user's operation.

Figure 8D:
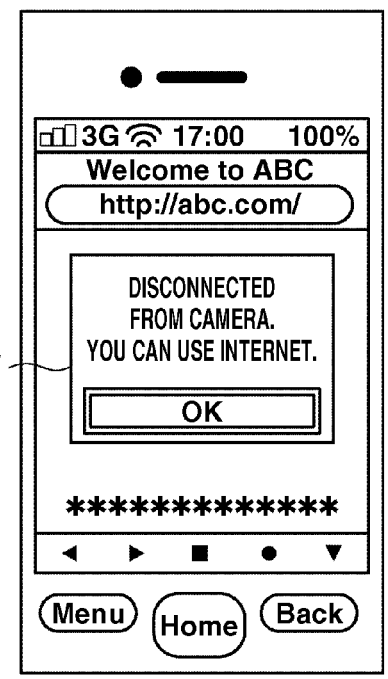

In the camera communication application according to the present exemplary embodiment, as illustrated in FIG. 8D, after application switching, at timing of exiting from the network formed by the simple AP, a message 231 indicating cutting-off of the connection with the digital camera is displayed. Further, when automatically participating in a new network after exiting from the network, this message is also notified.

When participation in a network formed by a normal AP is determined, the participation in the network is continued.

Figure 8E:
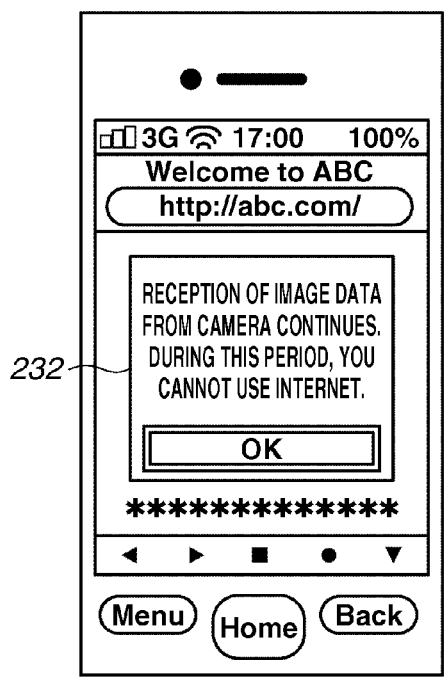

When an application switching instruction is received during reception of the image data from the digital camera 100 by the mobile phone 200, the reception of the image data can be continued without immediately exiting from the network. In this case, a message illustrated in FIG. 8E is displayed, the connection with the digital camera 100 is notified, and inhibition of using the Internet by the other applications during this period is notified.

FIG. 9 is a flowchart illustrating processing when switching is executed from the camera communication application to the other application. Hereinafter, each application may be described as an operation actor. In reality, however, processing is realized by controlling each unit of the mobile phone 200 by the control unit 201 according to a program of each application.

In step S901, the camera communication application stands by for notification of transition to the background. The OS that has detected the operation of the home button 221 by the user notifies the camera communication application of the transition to the background. When it is determined that the notification has been received (YES in step S901), the processing proceeds to step S902.

In step S902, the camera communication application that has transitioned to the background determines whether a network in which it is currently participating is a network formed by the simple AP of the digital camera 100. The control unit 201 performs the determination in this step by referring to the notification received from the digital camera in step S407 illustrated in FIG. 4A. When the control unit 201 determines that the network is not a network formed by the simple AP of the digital camera 100 (NO in step S902), the processing proceeds to step S912. When the control unit 201 determines that the network is a network formed by the simple AP of the digital camera 100 (YES in step S902), the processing proceeds to step S903.

First, a case where the processing proceeds from step S902 to step S912 will be described. In this case, it is determined that the network in which the own device is currently participating is a network formed not by the simple AP of the network but by an external AP. In other words, a connection form illustrated in FIG. 3A is determined. In this case, the connection to the network of current participation is maintained (step S912). Thus, the other applications can use the Internet.

Next, a case where the processing proceeds from step S902 to step S903 will be described. In step S903, the camera communication application determines whether image data is being received from the digital camera 100. When it is determined that the image data is being received (YES in step S903), the processing proceeds to step S904. When otherwise (NO in step S903), the processing proceeds to step S907.

When the image data is being received, a message illustrated in FIG. 8E is displayed to notify continuance of the connection with the digital camera. The operation of receiving the image from the digital camera has been instructed by the user. Thus, if ongoing image reception processing is self-evident, this message may not be displayed. Then, in step S905, the reception processing of the image data from the camera is continued. When it is determined that the reception of the image data has been completed (YES in step S906), the processing proceeds to step S907.

In step S907, after it has transitioned to the background, the camera communication application stands by for a certain period of time. This is in view of a possibility that the user may connect to the other application by an erroneous operation, and for the purpose of maintaining the connection with the digital camera if the camera communication application is quickly returned to the foreground. The certain period of time is desirably set long enough, such as ten seconds, to determine that application switching is not an erroneous operation. The step S907 does not always need to be executed. By omitting the step S907, an application of a switching destination may be immediately used.

In step S908, the camera communication application determines whether it is still in the background state. When it is determined to be still in the background state (YES in step S908), then in step S909, the camera communication application exits from the network and, in step S910, connects to a new network. Then, in step S911, as illustrated in FIG. 8D, after application switching, at timing of exiting from the network formed by the camera, a message indicating cutting-off of the connection with the camera is displayed.

Though omitted, before the message is displayed in step S911, whether the Internet can be used by a new network can be determined, and then a message indicating permission/ inhibition of the use can be displayed.

In the present exemplary embodiment, the exiting from the network is controlled based on the transition of the camera communication application to the background. However, other methods can be employed. For example, the mobile phone 200 can exit from the network after the camera communication application has transitioned to the background and the other application has been activated. The mobile phone 200 can determine, after the camera communication application has transitioned to the background and the other application has been activated, a type of the other activated application. In this case, the mobile phone 200 can perform control to exit from the network when it is determined that the other application has a function of cooperating with the Internet, and maintain the connection with the network when it is determined that the other application does not have a function of cooperating with the Internet.

In the first exemplary embodiment, the form of switching the network to participate in on the mobile phone 200 side when necessary has been described. However, there may be a system that cannot easily perform network switching control. Especially, in the case of a mobile phone referred to as a smartphone, division of roles between the OS and an application operated on the OS is definite to a certain extent. For example, there may be a case where network switching is a function of the OS, and network switching control cannot be performed from the application. According to a second exemplary embodiment, even in such a case, appropriate processing can be performed according to a feature of a network. The second exemplary embodiment has many portions similar to those of the first exemplary embodiment. Thus, description of the similar portions will be omitted, and unique portions of the second exemplary embodiment will be mainly described. Hereinafter, the OS or a camera communication application may be described as a processing actor. In reality, however, needless to say, a control unit 201 realizes various processes by reading a program of the OS or the camera communication application.

FIG. 10 is a flowchart illustrating an operation of a mobile phone 200 according to the second exemplary embodiment. The flowchart illustrates processing after connection with a digital camera 100. Processes similar to those illustrated in FIG. 6A are denoted by similar reference numerals, and steps different from those of the flowchart illustrated in FIG. 6A are steps S1001 to S1004.

In step S1001, the camera communication application transmits a deletion request of a formed network to the connected digital camera 100. The digital camera 100 that has received the request deletes a network formed by a simple AP function of its own device. As described above, as network deletion processing, the digital camera 100 stops transmission of a beacon signal, and notifies the network of deletion of the network.

Then, in step S1002, whether the connected network has been deleted is determined. When it is determined that the network has been deleted (YES in step S1002), the processing proceeds to step S1003. When it is determined that the network has not been deleted (NO in step S1002), the processing is repeated.

The OS according to the present exemplary embodiment, which has detected that the network in which the device has participated thus far has been deleted, performs network switching. First, a surrounding wireless LAN network is searched for. When a wireless LAN network connected once is detected, the device participates in the network. When the wireless LAN network connected once is not detected, the processing is switched to 3G communication. Thus, while it is unable to directly switch a network in which the mobile phone 200 participates, the camera communication application can indirectly switch the network by performing control to delete the network formed by the digital camera 100.

Then, in step S1003, the camera communication application requests the OS to transmit image data to the Internet. Specifically, an address of a transmission or information specifying image data to be transmitted is notified to the OS. The processing of the communication application is up to this point.

In step S1004, the OS transmits the image data to the Internet via the network of current participation.

An operation of the mobile phone 200 according to the present exemplary embodiment has been described. Next, an operation of the digital camera 100 will be described. FIG. 11 is a flowchart illustrating the operation of the digital camera 100 according to the present exemplary embodiment. The flowchart illustrates processing after connection with the mobile phone 200. Processes similar to those illustrated in FIG. 6B are denoted by similar reference numerals, and steps different from those of the flowchart illustrated in FIG. 6B are steps S1101 and S1102. When the control unit 101 determines that a request is not a request of obtaining the image data (NO in step S657), the processing proceeds to step S1101.

In step S1101, the control unit 101 determines whether a request from the mobile phone 200 is a network deletion request. When it is determined that the request is a network deletion request (YES in step S1101), the processing proceeds to step S1102. When otherwise (NO in step S1101), the processing proceeds to step S660 to transmit an error.

In step S1102, the control unit 101 performs deletion processing of the network formed by the simple AP of the own device, and the processing is ended.

In the present exemplary embodiment, the deletion processing is performed at the time of receiving the network deletion request. However, reception of the processing is returned to the mobile phone 200, and the network deletion processing can be performed after a predetermined period of time. Accordingly, the mobile phone 200 can know that the request has been received.

Similarly, FIG. 12 is a flowchart illustrating processing of the camera communication application according to the present exemplary embodiment when application switching of the mobile phone is executed. Processes similar to those illustrated in FIG. 9 are denoted by similar reference numerals, and steps different from those of the flowchart illustrated in FIG. 9 are steps S1201 and S1202.

In step S1201, the camera communication application transmits a deletion request of a formed network to the connected digital camera 100. The digital camera 100 that has received the request deletes the network formed by the simple AP function of its own device. As described above, as network deletion processing, the digital camera 100 stops transmission of a beacon signal, and notifies the network of deletion of the network.

Then, in step S1202, whether the connected network has been deleted is determined. When it is determined that the network has been deleted (YES in step S1202), the processing proceeds to step S911. When it is determined that the network has not been deleted (NO in step S1202), the processing is repeated.

As described above, according to the present exemplary embodiment, even in the case of the system that cannot cut off the network by the application of the mobile phone, the user can upload the image data by the optimal network without being aware of the connected state of the network.

A camera communication application according to a third exemplary embodiment performs timeout processing when not operated for a certain period of time. Specifically, communication is automatically stopped, and camera power is turned OFF. Accordingly, a possibility of wasteful communication can be reduced. Hereinafter, processing of a mobile phone 200 to realize this operation will be described.

Figure 13:
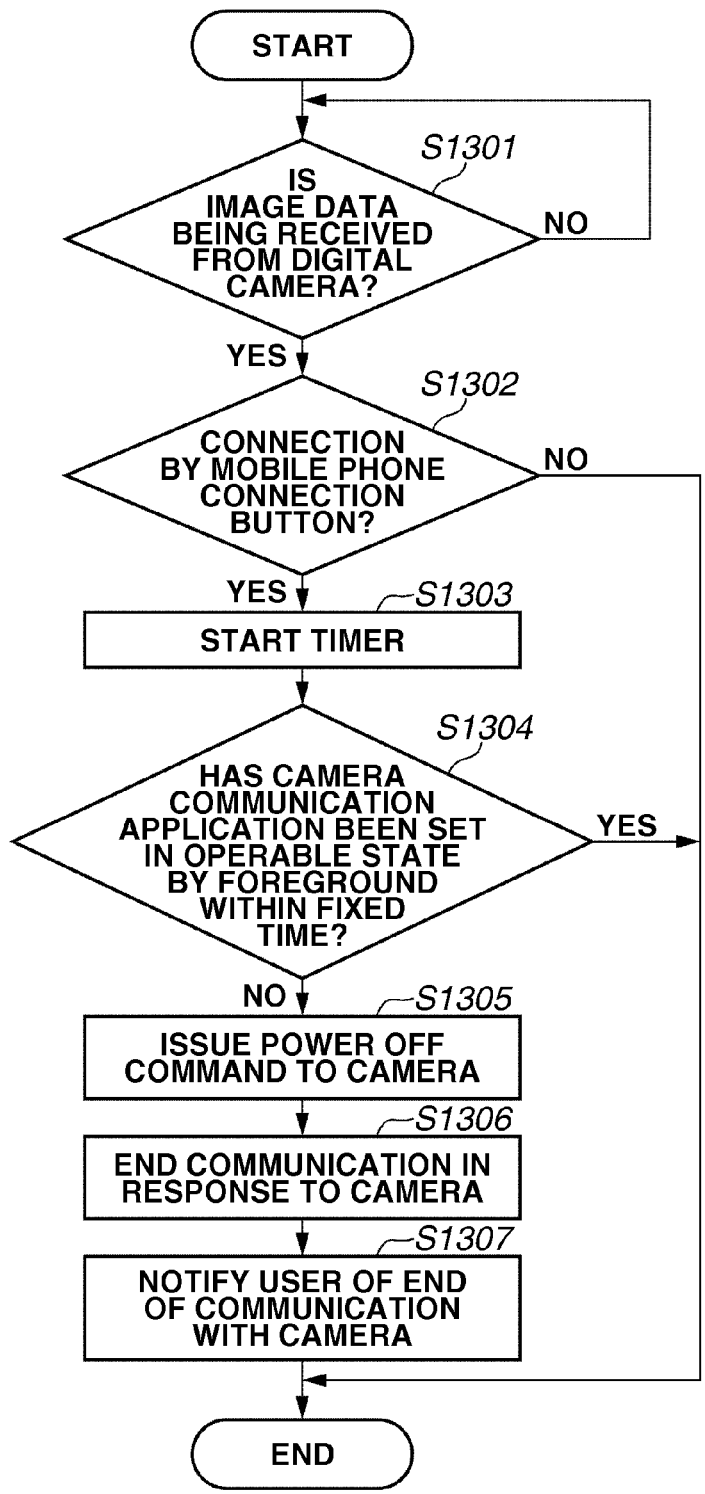
FIG. 13 is a flowchart illustrating an operation of the mobile phone.

FIG. 13 is a flowchart illustrating an operation of the mobile phone 200 in a state where the camera communication application is being executed in a background after connection with a digital camera 100. The processing of the flowchart is started by causing the camera communication application to transition to the background.

First, in step S1301, the control unit 201 determines whether image data is being received from a camera connected with the mobile phone 200. When the image data is being received (YES in step S1301), the processing waits until completion of communication.

In step S1302, the control unit 201 determines whether the current communication is communication started by a connection button. Specifically, the control unit 201 can make this determination by referring to the information transmitted from the digital camera 100 in step S409 illustrated in FIG. 4A or step S457 illustrated in FIG. 4B. When it is determined that the current communication is not communication started by the connection button (NO in step S1302), in other words, it is communication started by a menu operation, the processing of the flowchart is ended without performing automatic communication cutting-off processing. This is because of a possibility that when the current communication is communication started by the menu operation, the processing will change to a camera operation mode, and operate the camera to transmit image data. On the other hand, when it is determined that the current communication is communication started by the connection button (YES in step S1302), the processing proceeds to step S1303.

In step S1303, the control unit 201 starts a timeout monitoring timer. There is recorded, in a nonvolatile memory 103, timeout time indicating predetermined fixed time. The control unit 201 monitors, until time counted by the timer reaches the timeout time, whether the camera communication application is in the operated state in the background and whether there is no reception of image data from the digital camera 100. In other words, processing of next step S1304 is repeatedly executed until the timeout time passes.

Then, in step S1304, the control unit 201 determines whether transitioning of the camera communication application to a foreground has been detected, and whether image data communication with the digital camera 100 has been detected. When it is determined that one of such has been detected from the start of the timer to the passage of the timeout time (YES in step S1304), the processing of the flowchart is ended. On the other hand, when it is determined that none of such has been detected (NO in step S1304), there is a possibility that a user forgets the execution of the camera communication application in the background. Thus, in this case, the processing proceeds to step S1305, and the control unit 201 issues a power-OFF command to the digital camera 100. Specifically, the control unit 201 transmits a control signal received by the digital camera 100 to turn OFF power. The digital camera 100 first performs processing to end the communication with the mobile phone 200.

Then, in step S1306, the control unit 201 receives a response to the power-OFF command from the digital camera 100, and completes the end of the communication. When the network in which the mobile phone 200 has participated is a network formed by the digital camera 100, the network is deleted accompanying the power-OFF control of the digital camera 100. In this case, the communication with the digital camera 100 is ended, and searching for a new network or connection to a public network is executed interlockingly with a function of an OS. On the other hand, when the network in which the mobile phone 200 has participated is a network formed by the other AP, the mobile phone 200 continues to participate in the network.

After the end of the communication with the digital camera 100, in step S1307, the control unit 201 displays, on a screen of the mobile phone 200, a message notifying the user of the cutting-off of the communication with the digital camera 100. This displaying method can use displaying executed by an application, or notification services provided by the OS.

The operation of the mobile phone 200 in the state where the camera communication application is being executed in the background after the connection with the digital camera 100 has been described.

Next, an operation of the digital camera 100 corresponding to the operation of the mobile phone 200 after the connection will be described.

Figure 14:
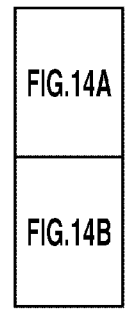
FIG. 14 (FIGS. 14A and 14B) is a flowchart illustrating an operation of the digital camera.
Figure 14A:
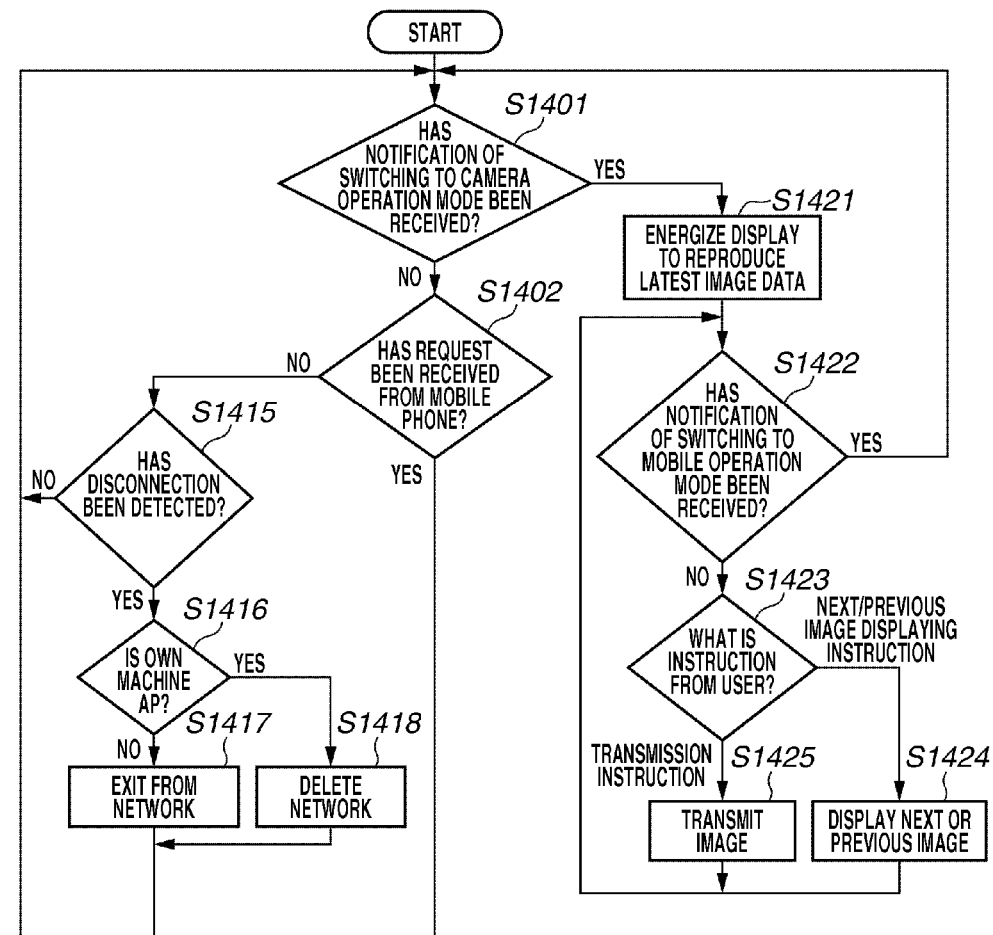
Figure 14B:
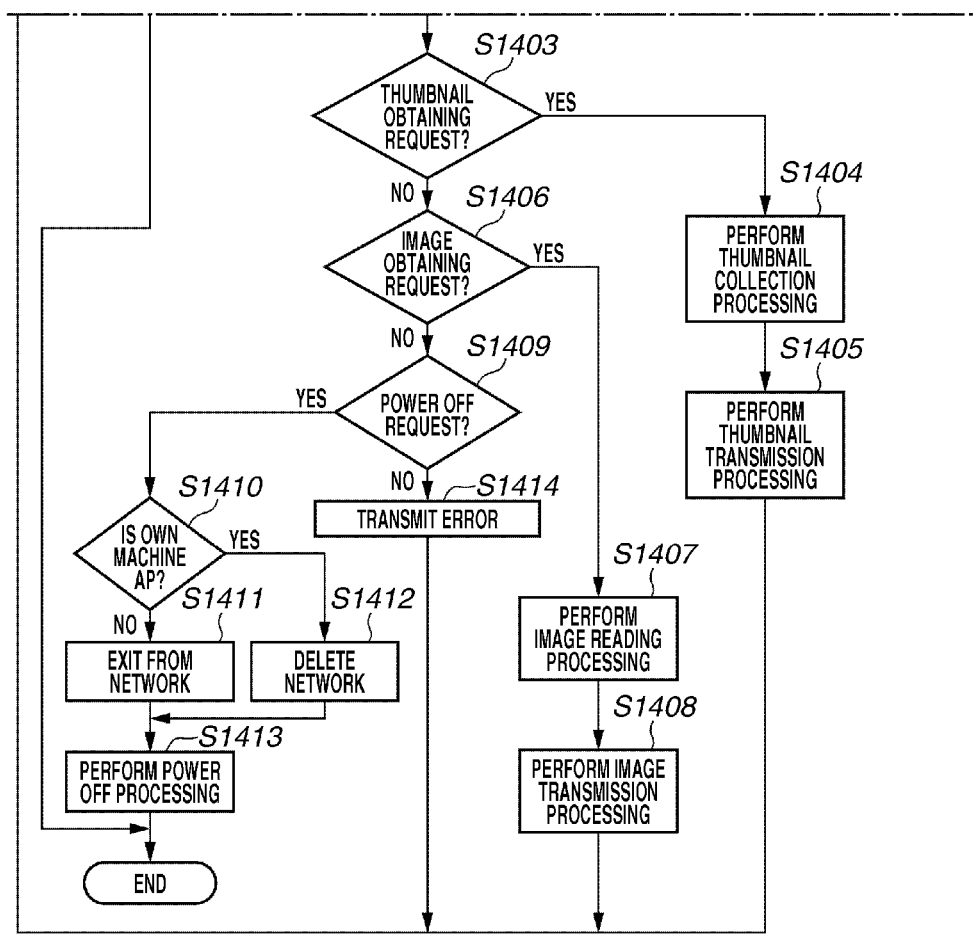

FIG. 14 (FIGS. 14A and 14B) is a flowchart illustrating the operation of the digital camera 100 after the connection with the mobile phone 200. After the communication with the mobile phone 200 has been established, transfer of image data is started in a mobile operation mode operated by the mobile phone 200.

In step S1401, the control unit 101 of the digital camera 100 determines whether a notification of operation mode switching has been received from the mobile phone 200 via the connection unit 111. The notification received in this case is the notification of the changing to the camera operation mode transmitted from the mobile phone 200 to the digital camera 100 in step S621 illustrated in FIG. 6A. When the communication is started based on an operation of a connection button as described above, the mobile phone 200 cannot change to the camera operation mode. In other words, the digital camera 100 cannot receive the notification of changing to the camera operation mode. Thus, when the current communication is communication started based on the operation of the connection button, the determination of this state can be omitted.

First, a case where a notification of operation mode changing has not been received will be described. In this case, the processing proceeds to step S1402.

In step S1402, the control unit 101 of the digital camera 100 determines whether a request has been received from the mobile phone 200 via the connection unit 111. The processing proceeds to step S1403 when it is determined that a request has been received (YES in step S1402), and to step S1414 when otherwise (NO in step S1402). A possible request to be received in this case is one of the thumbnail request transmitted in step S602, the image data request transmitted in steps S607 and S608, and the power-OFF request transmitted in step S1306.

A case where the processing proceeds to step S1403 will be described. In step S1403, the control unit 101 determines whether the request received in step S102 is a thumbnail request (request transmitted in step S602). When it is determined that the request is a thumbnail request (YES in step S1403), the processing proceeds to step S1404. When determined otherwise (NO in step S1403), the processing proceeds to step S1406.

First, a case where the processing proceeds to step S1404 will be described. In step S1404, the control unit 101 searches for, among image data stored in a recording medium 110, image data requested from the mobile phone 200, and reads a thumbnail corresponding to the retrieved image data in a work memory 104. Needless to say, a plurality of thumbnails can be read. In this case, a thumbnail already associated with the image data can be used or a new thumbnail can be generated.

In step S1405, the control unit 101 transmits the thumbnail stored in the work memory 104 to the mobile phone 200, and the processing returns to step S1401. As a result of this processing, on the mobile phone 200 side, thumbnail reception processing of step S603 is performed. The processing of transmitting the thumbnail from the digital camera 100 to the mobile phone 200 has been described.

Next, a case where the processing proceeds to step S1406 will be described. In step S1406, the control unit 101 determines whether the request received in step S1402 is a request of image data corresponding to the thumbnail (request transmitted in step S617). When it is determined that the request is a request of image data (YES in step S1406), the processing proceeds to step S1407. When determined otherwise (NO in step S1406), the processing proceeds to step S1409.

First, a case where the processing proceeds to step S1407 will be described. In step S1407, the control unit 101 searches for requested image data among the image data stored in the recording medium 110, and reads the retrieved image data in the work memory 104.

Then, in step S1408, the control unit 101 transmits the image data stored in the work memory 104 to the mobile phone 200, and the processing returns to step S1401. As a result of this processing, on the mobile phone 200 side, image data reception processing of step S608 is performed.

Next, a case where the processing proceeds to step S1409 will be described. In step S1409, the control unit 101 determines whether the request received in step S1402 is a power-OFF request of the camera. When it is determined that the request is a power-OFF request (YES in step S1409), the processing proceeds to step S1410. When determined otherwise (NO in step S1409), the processing proceeds to step S1414.

First, a case where the processing proceeds to step S1410 will be described. In step S1410, the control unit 101 determines whether the own device is operating as a simple AP. When it is determined that the own device is not operating as a simple AP (NO in step S1410), the processing proceeds to step S1411. When it is determined that the own device is operating as a simple AP (YES in step S1410), the processing proceeds to step S1412. In step S1411, the control unit 101 performs exiting processing from the network in which it is currently participating. On the other hand, in step S1412, the control unit 101 deletes the network currently formed by the own device. Specifically, the control unit 101 stops transmission of a beacon signal, and broadcasts, to the network, a notification indicating deletion of the network.

Then, in step S1413, the power of the digital camera 110 itself is cut off.

On the other hand, when the processing proceeds to step S1414, determining that the own device cannot appropriately respond to the received request, the control unit 101 transmits an error notification indicating this to the digital camera 100.

Next, a case where the processing proceeds from step S1402 to step S1415 will be described. In step S1415, the control unit 101 determines whether the connection has been cut off. The following cases where the connection is determined to have been cut off in this step are conceivable: a case where communication established with the mobile phone 200 has been cut off, a case where the mobile phone 200 is not present any more in the network, and a case where the own device is unable to receive any beacon signal from the AP to lose sight of the network. When the own device is operating as a simple AP, the network is not lost sight of. When it is determined that the connection has been cut off (YES in step S1415), the processing proceeds to step S653. When determined otherwise, (NO in step S1415), the processing returns to step S1401.

The processing of steps S1416 top S1418 is similar to that of steps S1410 to S1412, and thus description thereof will be omitted. After the steps S1417 and S1418, the processing of the flowchart is ended without executing step S1413.

The case where it is determined in step S1401 that the notification of operation mode changing has not been received has been described.

Next, a case where it is determined in step S1401 that the notification of operation mode changing has been received will be described. In this case, the processing proceeds to step S1421.

In step S1421, the control unit 101 starts energization to the display, and reproduces, among the image data recorded in the recording medium 110, image data of a latest capturing date. When the display has been ON, processing of starting energization is not performed. Simultaneously, the control unit 101 receives an instruction from the user via the operation unit 105. As a result, on the camera side, a camera operation mode for inputting an instruction of the image data is set.

Then, in step S1422, the control unit 101 determines whether a notification of operation mode switching has been received from the mobile phone 200 via the connection unit 111. The notification received in this case is a notification of changing to the mobile operation mode, which is transmitted from the mobile phone 200 to the digital camera 100 in step S624 illustrated in FIG. 6A. When it is determined that the notification has been received (YES in step S1422), the processing returns to step S1401.

On the other hand, when it is determined that the notification has not been received (NO in step S1422), the processing proceeds to step S1423.

In step S1423, the control unit 101 determines an instruction received from the user.

When the instruction received in step S1423 is an instruction of image feeding or image returning, the processing proceeds to step S1424, and the control unit 101 displays images before and after a currently displayed image according to a predetermined order. Then, the processing returns to step S1422.

When the instruction received in step S1423 is an instruction of transmitting image data, the processing proceeds to step S1425, and the control unit 101 transmits the image data the instruction of which has been received to the mobile phone 200 via the connection unit 111. Then, the processing returns to step S1422.

The case where it is determined in step S1401 that the notification has been received has been described.

The operation of the digital camera 100 after the connection with the mobile phone 200 has been described.

As described above, according to the present exemplary embodiment, even when communication unintended by the user is continued due to the execution of the application in the background, the communication is automatically ended after a certain period of time. Thus, a possibility of wasteful communication unintended by the user can be reduced.

In the third exemplary embodiment, the case where the mode is set to the mobile operation mode after the communication has been established has been described. In this case, reception of the operation in the mobile operation mode is started when the communication is started based on an operation of the connection button, and reception of the operation in the camera operation mode is started when the communication is started based on the menu operation. For example, the digital camera 100 can start, after the connection with the mobile phone 200, processing from step S1402 when the communication is started based on the operation of the connection button, and from step S1421 when the communication is started based on the menu operation. Similarly, the mobile phone 200 can start, after the connection with the digital camera 100, processing from step S601 when the communication is started based on the operation of the connection button, and from step S621 when the communication is started based on the menu operation.

In the third exemplary embodiment, when the communication is started based on the menu operation, there is a possibility of changing to the camera operation mode. Thus, the processing of step S1303 and after illustrated in FIG. 9 is not performed. On the other hand, when the communication is started based on the operation of the connection button, there is a possibility that communication will be performed between the mobile phone 200 and the digital camera 100 in the mobile operation mode. To deal with this, in step S1302, determination can be made not as to by which operation connection starting has been performed but as to which of the camera operation mode and the mobile operation mode a current operation mode is. In other words, in the case of the camera operation mode, the user operates the camera, and accordingly the processing of step S1303 and after is not performed. On the other hand, in the camera operation mode, the processing of step S1303 and after is performed. As a result, the case where the communication is started based on the menu operation and the user operates the mobile phone 200 in the mobile operation mode can be dealt with. Further, in the camera operation mode, depending on a case, there is a possibility that an unoperated state will continue. To deal with such a case, without performing the determination of step S1302, in addition to the determination of step S1304, determination can be made as to whether reception of the image data from the digital camera 100 has started within a predetermined time. In such a case, according to the start of reception of the image data before the passage of predetermined time after the camera communication application has transitioned to the background, counting of the timer is reset, and the processing returns to step S1301. Thus, when the unoperated state in the camera operation mode continues, the power can be turned OFF. In the camera operated state, the power can be prevented from being turned OFF. In place of detecting the reception of the image data, whether an operation concerning transmission of the image data is being performed at the digital camera 100 can be detected. For example, when the digital camera 100 receives an image feeding/returning instruction in step S1424, the displaying of the display unit 106 is changed, and the operation is notified to the mobile phone 200. The mobile phone 200, which has received the notification, can detect the operation performed at the digital camera 100. Then, when any operation is performed before the passage of predetermined time after the transition to the background, the counting of the timer is reset, and the processing returns to step S1301.

Generally, a certain mobile phone has a locking function of setting a locked state by receiving a predetermined operation. The locking function is a function for preventing a third party from using the phone. When the mobile phone is locked, only an operation for inputting a predetermined password is received, while other operations are not received. In the case of the mobile phone having such a locking function, the processing illustrated in FIG. 13 can be started according to the transition to the locked state. In this case, in step S1304, in addition to whether the camera communication application has transitioned to the foreground, whether the locked state has been released is determined. Further, when the mobile phone has transitioned to the locked state, a power-OFF command can be immediately issued to the camera without waiting for a passage of fixed time.

Recently, there has been developed a mobile phone that has an economy mode capable of collectively setting limits of respective functions to suppress power consumption. Accordingly, in addition to the exemplary embodiment, information indicating which of ON and OFF setting of the economy mode is can be obtained from the digital camera 100, and the timeout time of step S1303 can be varied based on this information. For example, when the setting of the economy mode is ON, the timeout time in step S1303 illustrated in FIG. 13 is set short. Further, when the economy mode can be set at stages, the timeout time can be accordingly set at stages. Thus, an operation more along user's intension can be realized.

Recently, a model of a digital camera including a global positioning system (GPS) has been developed. Such a model has a function of periodically performing positioning by the GPS to store data as log data even when power is seemingly OFF. During execution of this function, even when a power-OFF request is received from the mobile phone 200, the power is prevented from being turned OFF. However, there is still a possibility that the user forgets the ongoing operation of the camera communication application in the background. Thus, only ending of the communication is executed.

In the present exemplary embodiment, the case where the digital camera 100 and the mobile phone 200 communicate with each other one to one has been described. For example, a plurality of mobile phones can be connected to one digital camera. In such a case, until power-OFF requests are received from all the connected mobile phones, the power of the digital camera 100 is not turned OFF. The communications with the mobile phones that have transmitted the power-OFF requests can be individually cut off.

The exemplary embodiment has been described by way of example where by the operation of the mobile phone, an operation actor is switched between the mobile phone 200 and the digital camera 100. For example, the operation mode can be switched by operating the digital camera 100. For example, an instruction of switching the operation mode can be input by displaying the button for switching the operation mode on the display unit 106 of the digital camera 100 currently engaged in communication and selecting this button by the user. In other words, a notification similar to that of the changing of the operation mode transmitted from the mobile phone 200 to the digital camera 100 in step S621 or step S624 is transmitted from the digital camera 100 to the mobile phone 200 according to inputting of a user's instruction.

In the above-described exemplary embodiments, the case where the mode cannot be changed to the camera operation mode when the communication is started based on the operation of the connection button has been described. In this regard, even when the communication is started based on the operation of the connection button, the mode can be changed to the camera operation mode.

Additional embodiments can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Applications No. 2012-233674 filed Oct. 23, 2012 and No. 2012-286673 filed Dec. 28, 2012, which are hereby incorporated by reference herein in their entirety.

What is claimed is:

1. A communication apparatus comprising:
a connection unit that connects to a first network formed by an access point;
a data communication unit configured to establish communication with an information processing apparatus on the first network by using a first application;
a determination unit configured to determine whether the information processing apparatus is operating as the access point forming the first network;
a detection unit configured to detect a transition of the first application to a background, wherein the first application is capable of transitioning to a foreground and the background; and
a control unit configured to perform control to disconnect from the first network after the determination unit determines that the information processing apparatus is operating as the access point and after the detection unit detects the transition of the first application to the background.

2. The communication apparatus according to claim 1, wherein the control unit performs control to disconnect from the first network after the determination unit determines that the information processing apparatus is operating as the access point and when a predetermined period of time has elapsed after the detection unit detects the change of the first application to the background.

3. The communication apparatus according to claim 2, wherein the communication apparatus is installed a second application, the second application has communication function via the Internet.

4. The communication apparatus according to claim 1, wherein while the data communication unit receives data from the information processing apparatus, the control unit does not perform control to disconnect from the first network.

5. The communication apparatus according to claim 1, wherein the control unit performs control to disconnect from the first network, which is formed by the information processing apparatus as the access point, by transmitting a signal to turn off power for the information processing apparatus.

6. The communication apparatus according to claim 1, further comprising a notification unit configured to, if the connection with the first network has been disconnected, provide notification of the disconnection.

7. The communication apparatus according to claim 1, wherein if the connection with the first network has been disconnected, the communication apparatus is connected to a second network different from the first network.

8. The communication apparatus according to claim 7, wherein the second network is a public network.

9. The communication apparatus according to claim 8, wherein the public network is a network based on 3G or LTE.

10. The communication apparatus according to claim 1, wherein the information processing apparatus includes no unit connectable to a public network.

11. The communication apparatus according to claim 1, wherein the information processing apparatus is a mobile phone.

12. The communication apparatus according to claim 1, wherein the communication apparatus is a tablet device.

13. The communication apparatus according to claim 1, wherein the information processing apparatus is a digital camera.

14. A method for controlling a communication apparatus, comprising:
connecting to a first network formed by an access point;
establishing communication with an information processing apparatus on the first network by using a first application;
determining whether the information processing apparatus is operating as the access point forming the first network;
detecting a transition of the first application to a background, wherein the first application is capable of transitioning to a foreground and the background; and
performing control to disconnect from the first network, after it is determined that the information processing apparatus is operating as the access point and after the transition of the first application to the background is detected.

15. A non-transitory computer-readable storage medium storing computer executable instructions that cause a computer to execute the method of claim 14.

16. The communication apparatus according to claim 1, wherein if the determination unit determines that the information processing apparatus is not operating as the access point, the control unit is configured not to perform control to disconnect from the first network even if the detection unit detects the transition of the first application to the background.

17. The communication apparatus according to claim 1, wherein if the determination unit determines that the information processing apparatus is not operating as the access point, the data communication unit is configured to establish communication with the information processing apparatus via an external access point, the external access point being different from the information processing apparatus and configured to form the first network.

* * * * *